United States Patent [19]

Rago

[11] Patent Number: 5,089,954
[45] Date of Patent: Feb. 18, 1992

[54] METHOD FOR HANDLING CONVERSATIONAL TRANSACTIONS IN A DISTRIBUTED PROCESSING ENVIRONMENT

[75] Inventor: Vito Rago, Brooklyn, N.Y.

[73] Assignee: Bell Communications Research, Inc., Livingston, N.J.

[21] Appl. No.: 229,241

[22] Filed: Aug. 8, 1988

[51] Int. Cl.$^5$ .................................. G06F 13/14
[52] U.S. Cl. ................................. 395/600; 364/284;
364/284.4; 364/282.1; 364/282.4; 364/240.8;
364/242.94; 364/DIG. 1; 340/825.03; 379/229;
379/269; 395/800
[58] Field of Search ........ 364/200, 900, 200 MS File,
364/900 MS File; 379/229, 269; 340/825.5,
825.52, 825.03

[56] References Cited

U.S. PATENT DOCUMENTS

| | | | |
|---|---|---|---|
| 4,112,488 | 9/1978 | Smith | 364/200 |
| 4,191,860 | 3/1980 | Weber | 179/18 |
| 4,356,546 | 10/1982 | Whiteside et al. | 364/200 |
| 4,451,700 | 5/1984 | Kempner et al. | 179/2 |
| 4,554,418 | 11/1985 | Toy | 179/2 |

OTHER PUBLICATIONS

Bell Communications Research Specification of Signalling System 7, Technical Reference TR-NPL-000246, Issue 1, vol. 1, 1985.

J. O. Boese et al., "Service Control Point—Database for 800 Service", Conference Record of Globecon '86: IEEE Global Telecommunications Conference Dec. 1-4, 1986, Houston, Texas, vol. 3, Dec. 1986, pp. 1316-1319.

S. D. Davidson, "Optimism and Consistency in Partitioned Distributed Database Systems", ACM Transactions on Database Systems, vol. 9, No. 3, Sep. 1984, pp. 456-481.

H. Garcia-Molina et al., "SAGAS", Proceedings of ACM Special Interest Group on Management of Data 1987 Annual Conference, San Francisco, Calif., 27-29, May 1987, pp. 249-259.

H. Garcia-Molina, "Using semantic Knowledge for Transaction Processing in a Distributed Database", ACM Transactions on Database Systems, vol. 8, No. 2, Jun. 1983, pp. 186-213.

(List continued on next page.)

Primary Examiner—Gareth D. Shaw
Assistant Examiner—Paul Kulik
Attorney, Agent, or Firm—James W. Falk; Leonard Charles Suchyta

[57] ABSTRACT

In a distributed processing system having a least an originating node and a responding node connected through a communication path, the responding node comprising a plurality of processors and a memory device and where each of these processors is capable of accessing information from a corresponding database residing within the memory device, the inventive method involves: storing context information for an associated conversational transaction using a first processor situated within the responding node wherein the context information is stored at a pre-defined address in a first database residing within the memory device and associated with the first processor; producing a first message using the first processor for transmission from the responding node over the communication path to the originating node wherein the first message contains a first transaction identifier field having a value that corresponds to the pre-defined address; generating within the originating node a second message for transmission from the originating node over the communication path to the responding node wherein the second message contains a second transaction identifier field having substantially the same value as the first transaction identifier filed; and accessing the record using a second processor located within the responding node in response to reception of the second message at the second processor by generating the pre-defined address within the second processor using the value of the second transaction identifier field so as to permit the second processor to incrementally process said conversational transaction within the responding node.

22 Claims, 17 Drawing Sheets

T. Haerder et al., "Concepts for Transaction Recovery in Nested Transactions", Proceedings of ACM Special Interest Group on Management of Data 1987 Annual Conference, San Francisco, Calif., 27-29, May 1987, pp. 239-248.

C. Mohan et al., "Transaction Management in the R* Distributed Database Management System", ACM Transactions on Database Systems, vol. 11, No. 4, Dec. 1986, pp. 378-396.

M. G. Walker, "Get Inside CCITT Signalling System No. 7", Telephony, Mar. 10, 1986, pp. 72 and 74-77.

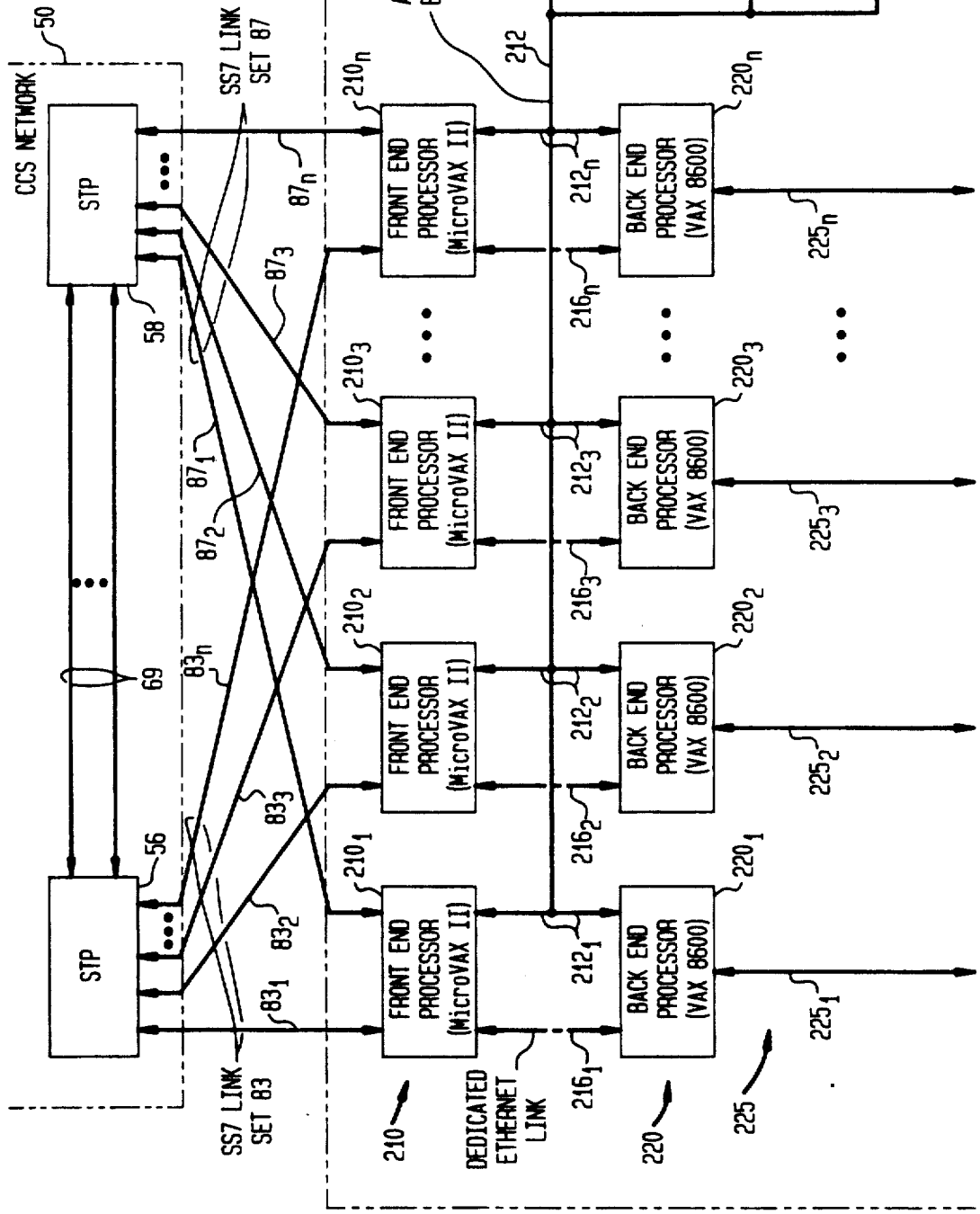

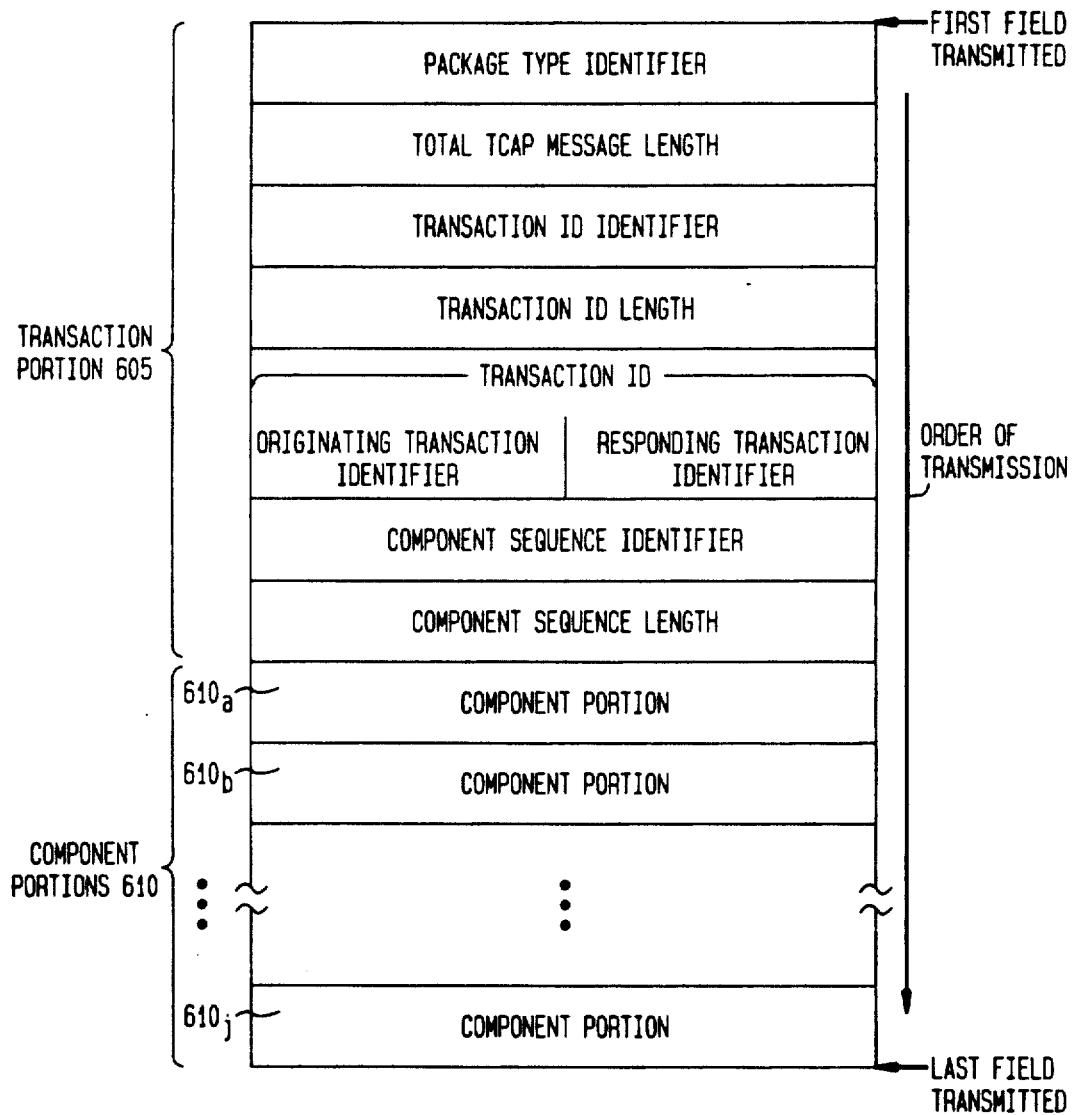

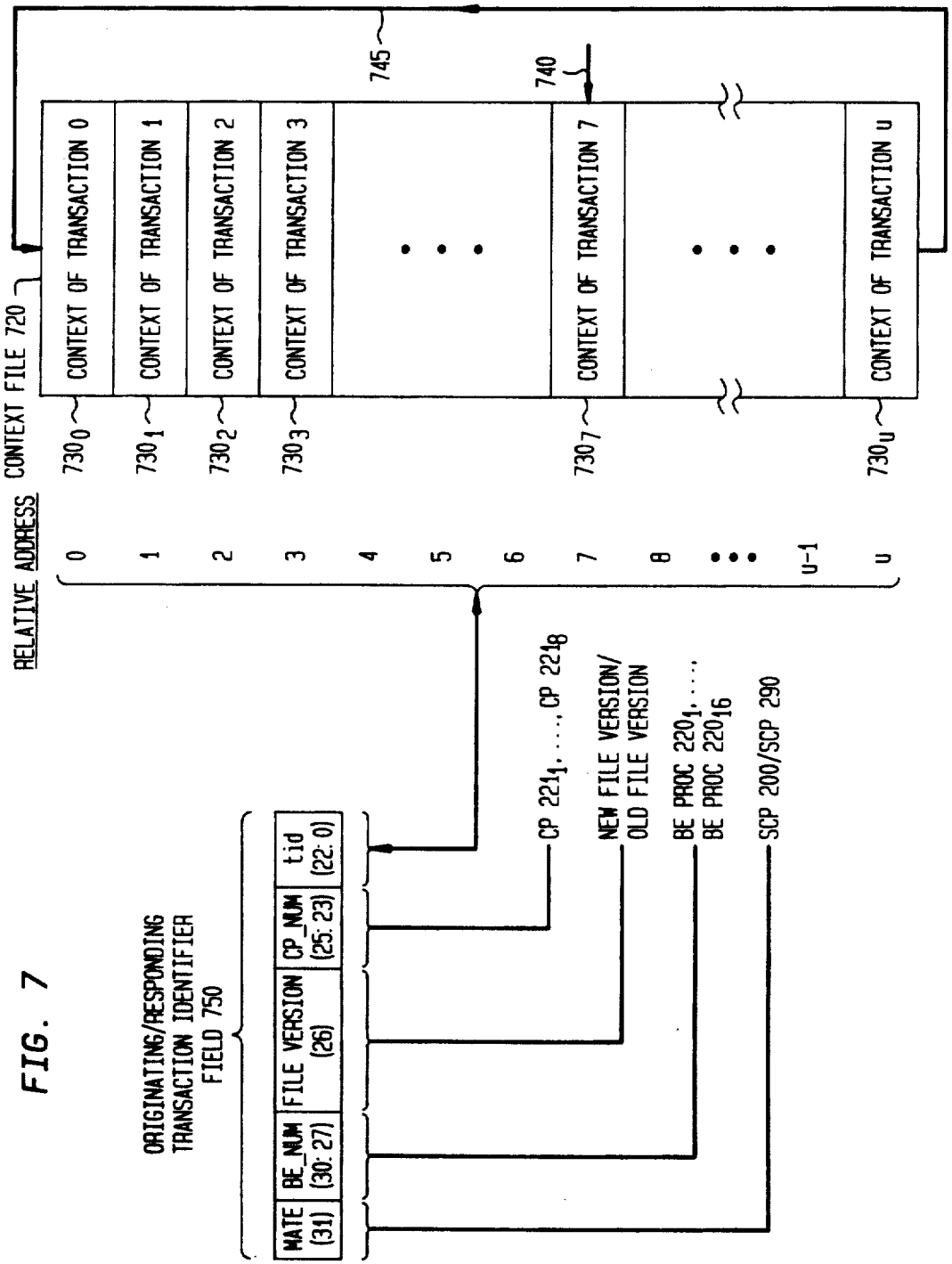

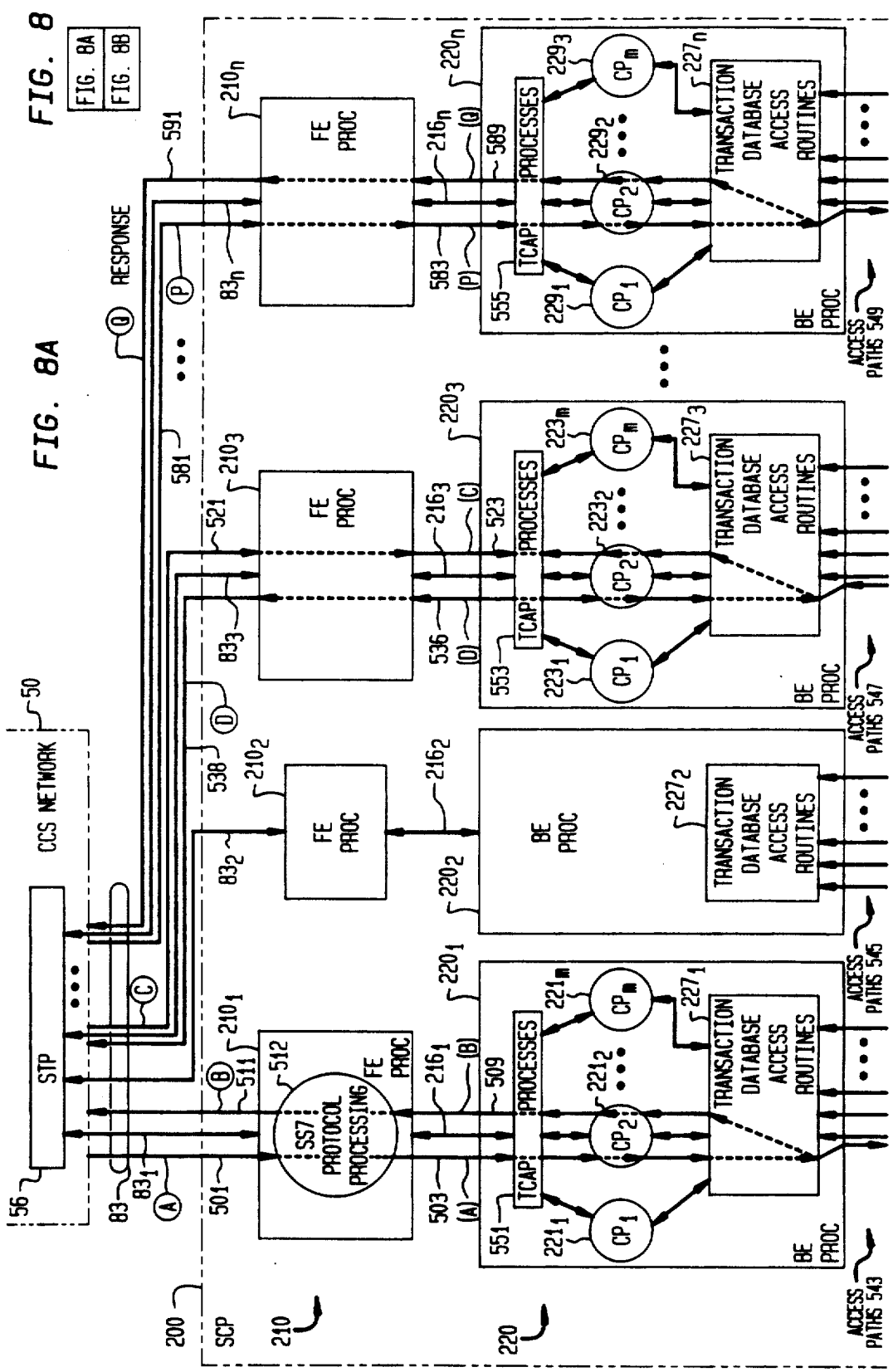

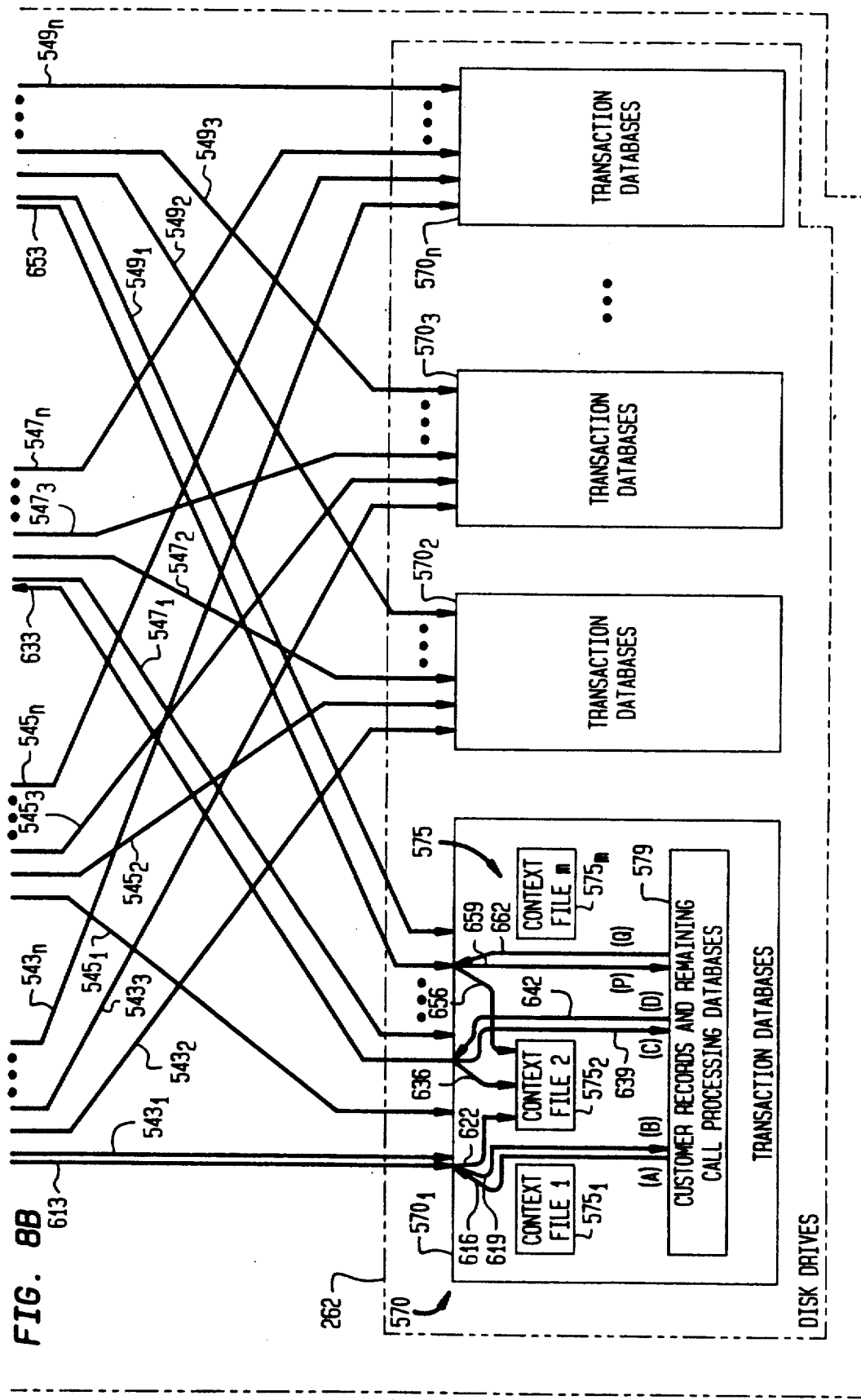

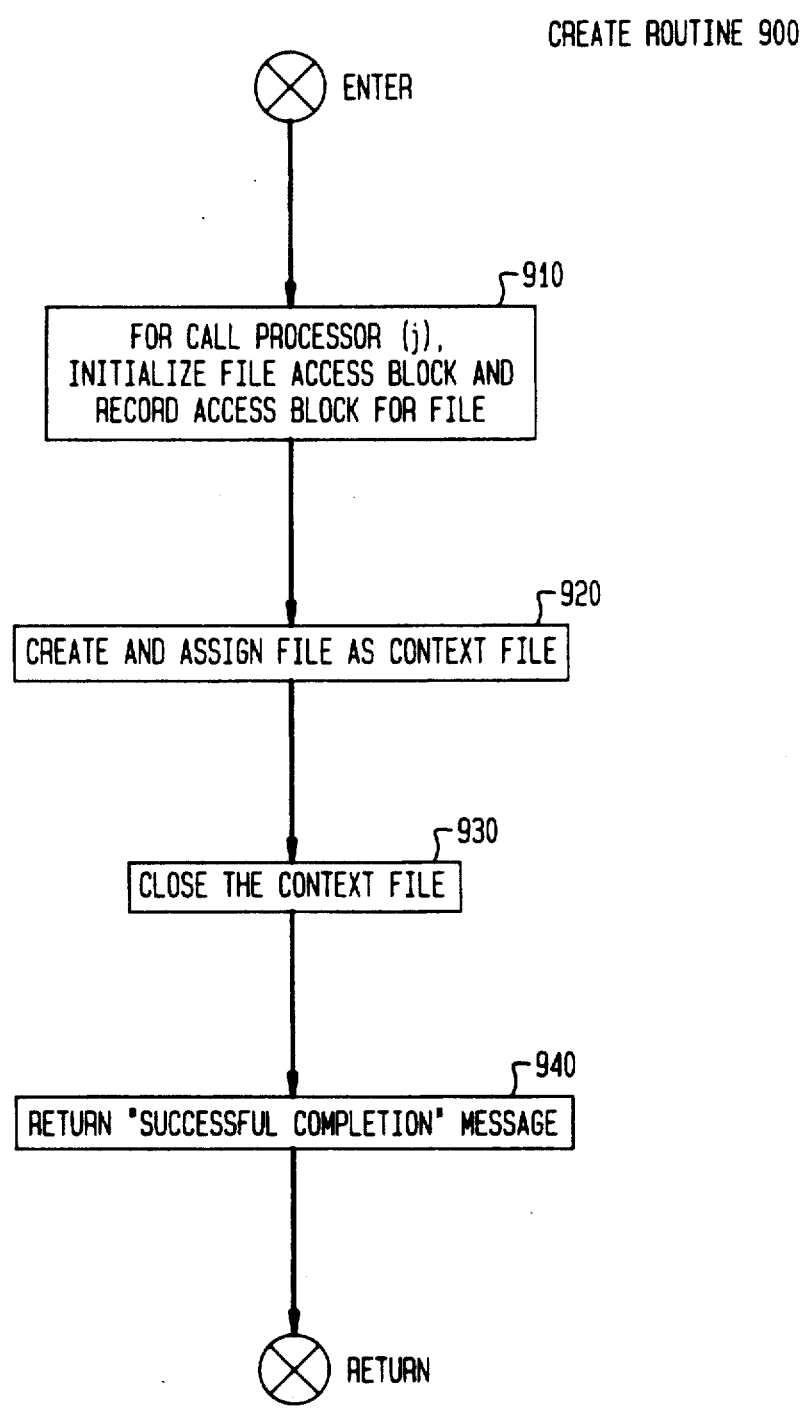

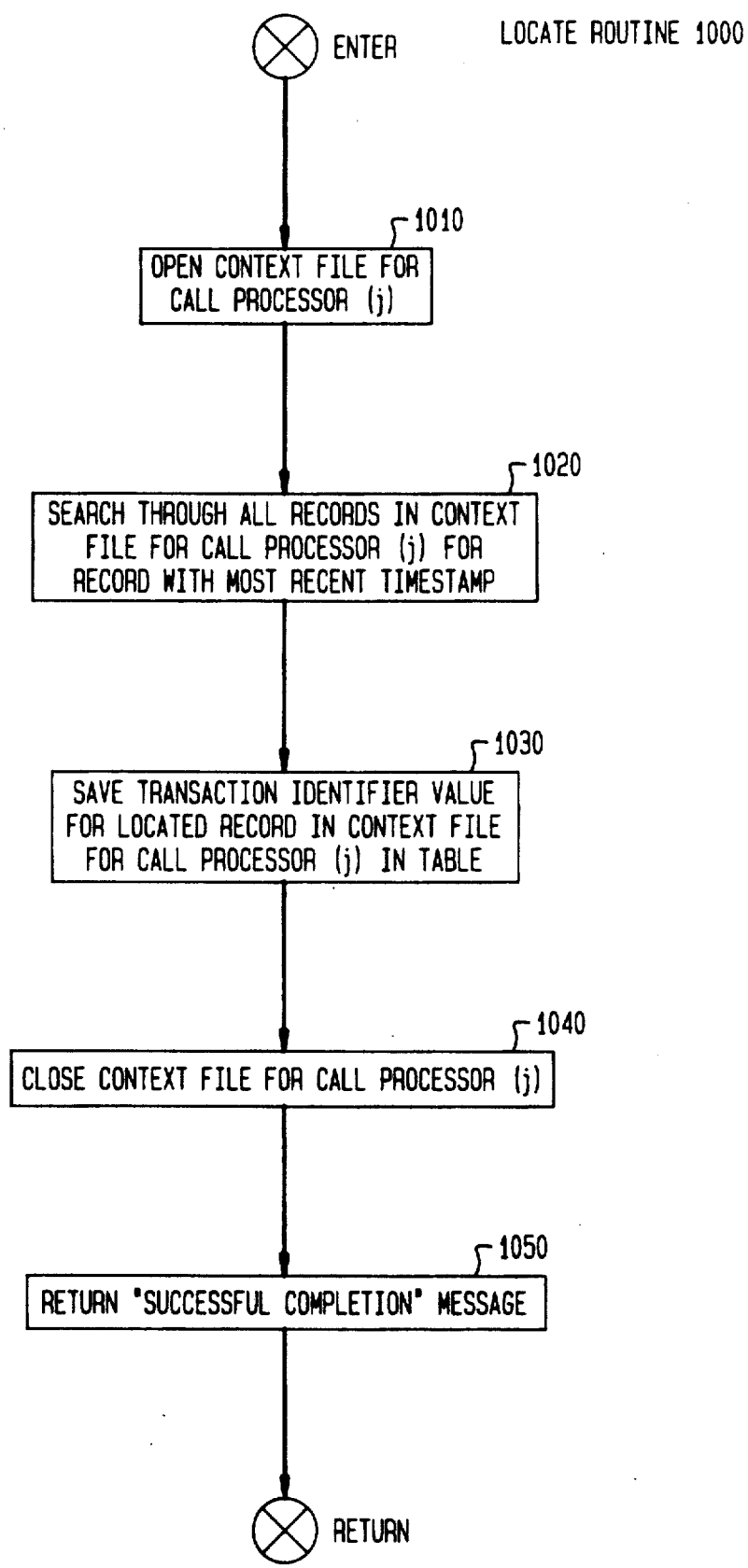

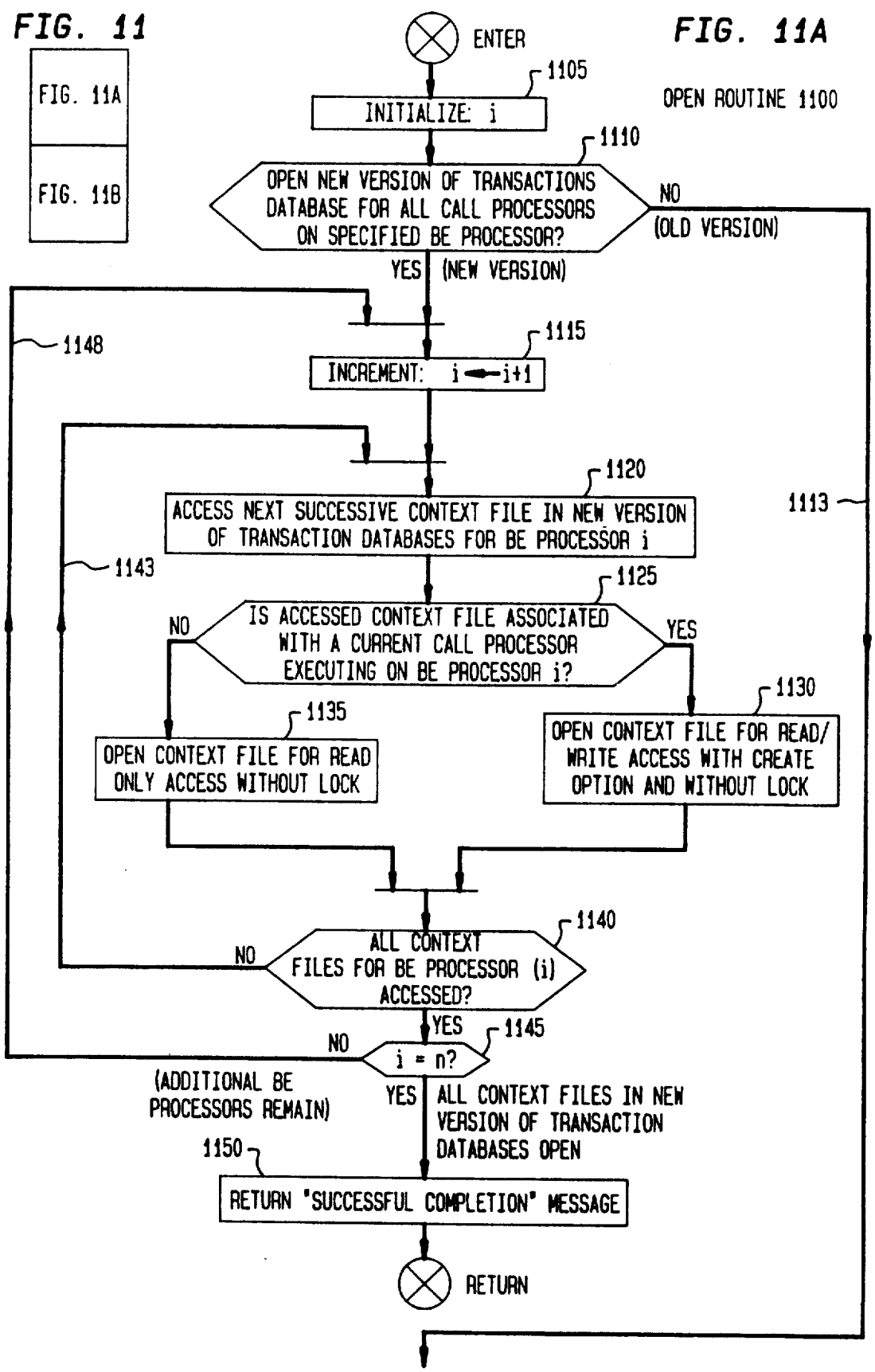

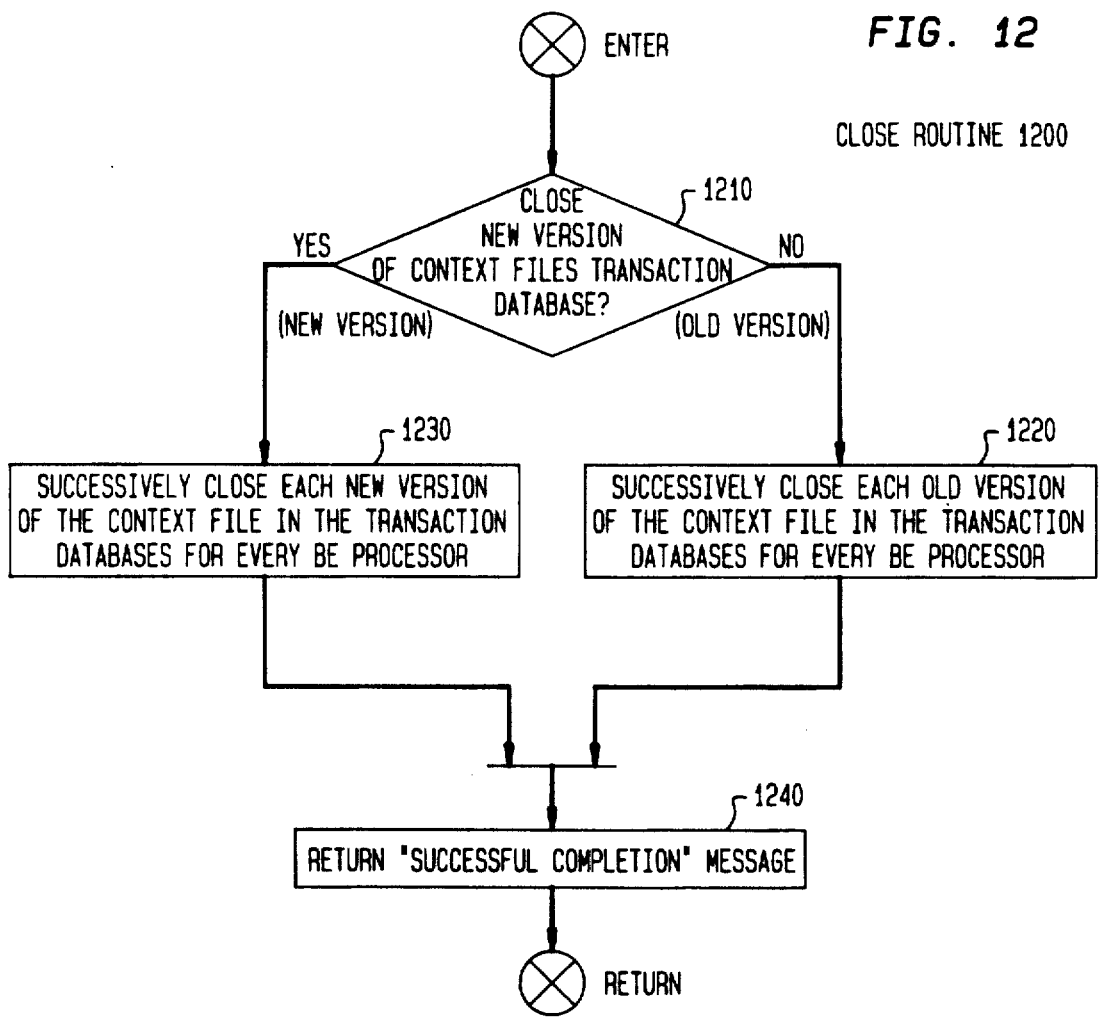

METHOD FOR HANDLING CONVERSATIONAL TRANSACTIONS IN A DISTRIBUTED PROCESSING ENVIRONMENT

BACKGROUND OF THE DISCLOSURE

The invention relates to a method for handling conversational transactions in a distributed processing environment and specifically to such a method suited for use in real time fault tolerant transaction processing system employed in a service control point.

A service control point ("SCP") is a fault tolerant transaction processing system that controls routing of telephone calls, within the telephone network, that require special handling, such as 800 and calling ("credit") card calls. In particular, whenever a telephone subscriber dials such a call, the call is first routed to an equal access switch, located either at a local office or elsewhere, which has service switching point capability (such a switch will hereinafter be referred to as an "SSP"). Primarily, the SSP processes calls that require remote data base translation. Now, whenever the SSP recognizes a call as one that requires special handling, the SSP suspends normal call processing, launches a message over a common channel signalling ("CCS") network to an SCP to determine how the call is to be routed, and finally upon receipt of a response message from the SCP, routes the call in a manner specified by the response message.

Specifically, whenever a subscriber places a call to an 800 number, the local switch routes the call to an SSP. The SSP fabricates a query in the form of a packet. This packet contains the 800 called number and a request for a destination routing number associated with the 800 number and, additionally, identification of a particular long distance (inter-exchange) carrier over which the call is to be routed. This packet is then routed over a common channel signalling line in a CCS network to a particular one of several geographically separated signalling transfer points (STPs). Specifically, the CCS network typically consists of a multi-level hierarchy of STPs, wherein each STP is primarily a packet switch. The first STP to receive the packet, i.e. the "originating" STP, then routes the packet, over an available link to an SCP for processing or, via a specified link, to another STP for eventual routing to an SCP.

The SCP itself is a fault tolerant transaction processing system that contains various databases that collectively provide desired call routing information. These databases contain a "customer record" which for 800 calls to a particular customer specifies how each such call is to be routed. For example, this record frequently contains one or more destination routing numbers associated with a particular 800 number and specifies the manner in which one of these destination routing numbers is to be selected, e.g. in accordance with the time of day, day of month, originating numbering plan area of the caller or other pre-defined method. Each transaction processed by an SCP for 800 service typically involves receipt of a packet followed by generation of a corresponding response. In particular, whenever a query is received, via an incoming packet, the SCP performs associated database access operations to obtain a necessary destination routing number and an inter-exchange carrier identification for the corresponding 800 call. The resulting information is then transmitted, as a packet, over the CCS network by the SCP, and via one or more STPs, back to an "originating" SSP which generated the corresponding query. Once a packet containing the destination routing number and inter-exchange carrier selection is received, the originating SSP appropriately routes the 800 call to the destination routing number.

Various architectures can be used to implement an SCP. One such architecture is disclosed in detail in Boese et al United States patent application, "A REAL-TIME FAULT TOLERANT TRANSACTION PROCESSING SYSTEM", filed Nov. 25, 1987, Serial Number 07/125,463 now abandoned and succeeded by continuation application filed Dec. 12, 1989, Ser. No. 07/453,042 both of which are currently owned by the present assignee and is disclosed to a much lesser extent in J. O. Boese et al, "Service control point—Database for 800 Service", *Conference Record of Globecon '86: IEEE Global Telecommunications Conference December 1-4, 1986 Houston, Tex.* Vol. 3, December 1986, pages 1316-1319. This architecture, hereinafter referred to as the replicated front end—back end architecture, is a network based communication system that employs: (a) a layered communication protocol that adaptively distributes packets on an approximately equal basis over multiple active physical links that connect two points (nodes) within the network, such as, for example, an SCP and an STP, and (b) a pair of non-fault tolerant front end (FE) and back end (BE) processors that is connected within the SCP to each physical link for handling the processing of packets appearing on that link. Each FE processor is connected to a corresponding link in a link set and is, also, connected to an associated BE processor. All the BE processors are connected through an appropriate coupling device, such as a star coupler, to a shared disk farm in order to provide access to files stored therein. The protocol, hereinafter referred to as signalling system 7 (SS7), is the ANSI (American National Standards Institute) implementation, as recommended by the ANSI T1X1.1 working group of the signalling system 7 standard that has been initially promulgated by CCITT. All the FE and BE processors are loosely coupled together, through various local area networks, for purposes of processor synchronization and re-assignment.

Each FE processor handles the SS7 protocol which includes framing, synchronization, error checking and correction, and other associated communication tasks. Its corresponding BE processor provides database access operations to support query processing. One of the BE processors within the SCP executes various software procedures to co-ordinate the operation of all the FE and BE processors therein so that individual processors within the SCP and/or any application software executing on any of the BE processors can be gracefully brought into or taken out of service.

Now, in the event any physical link in a link set or either a FE or BE processor connected thereto fails, then that link is declared to be out of service. When this occurs, the STP that is connected to that link set, through processing of the SS7 protocol, merely reassigns all subsequently occurring packets among all the remaining active links in the set until such time as the fault is cleared. By virtue of link re-assignment, there is no need to connect a fault tolerant processor to each physical link. As such, a number of loosely coupled FE-BE processor pairs can be substituted within an SCP for a number of fault tolerant processors. Now, by eliminating the need to use fault tolerant processors, advantageously the replicated FE-BE architecture substantially reduces the complexity and cost of an SCP.

The replicated FE-BE architecture provides excellent fault tolerant performance for simple "Query—Response" type transactions. Such a transaction is typified by one, as discussed above, in which a query, such as an 800 call query, is sent out by an SSP to an SCP and a needed response, i.e. the destination routing information, is furnished through a single database access and then sent by the SCP back to the SSP. Unfortunately, not all transactions that require SCP processing are quite so simple.

In particular, in certain enhanced network services, such as those needed to implement a private virtual network (PVN), the transactions are much more complex than simple "Query—Response" transactions. Specifically, these services often require a caller to enter information, in addition to the called number, on an interactive basis before the SCP can fully process the call. In particular, for such a service, the caller generally dials an appropriate telephone number to gain access to the service. Once this occurs, the SSP associated with this caller routes a request to the SCP that handles this service. The SCP performs a database access into a customer record to determine the next piece of needed information, e.g. a personal identification number (PIN) and authorization code, that has to be obtained from the caller. Once this occurs, the SCP requests this piece of additional information by in effect questioning the caller. In particular, the SCP inserts an appropriate op code within a transaction capability application part (TCAP) message, and then transmits this message as an SS7 packet via the CCS network back to the SSP. In response to this op code, the SSP synthesizes a pre-defined voice message to prompt the caller to enter the desired piece of additional information. Once the caller provides an answer, it is transmitted as a TCAP message within another SS7 packet by the SSP back to the SCP that requested it. In response to the answer, the SCP then re-accesses the customer record in order to determine the next piece of information it needs from the caller, and so on. Inasmuch as the nature of each additional piece of information often varies in response to the previous answer, the question and answer session occurring between the caller and the SCP is carried out on an interactive basis. Each question and answer session, henceforth referred to as a conversation with each TCAP message that carries part of the conversation being referred to as a conversational message, continues until the SCP has collected enough information from the caller via the SSP, as defined by the customer record, to fully determine how the call is to be routed. Once this occurs, the SCP sends its response containing destination routing information back to the SSP which, in turn, routes the call accordingly. At this point the SCP has fully processed the transaction. As such, a conversation based transaction can be viewed as "Query—Conversation—. . . —Conversation—Response".

Unfortunately, the replicated FE-BE architecture is not suited for readily processing conversational transactions. As noted, incoming packets to an SCP are distributed by the SS7 protocol on an approximately even basis among the active physical links in a link set connected to an SCP and from there to corresponding FE-BE processor pairs located within the SCP. A typical conversational transaction typically involves a series of incoming packets to an SCP. As a result of packet distribution occurring over a link set, individual packets that form the conversational transaction will probably be scattered among all the FE processors in the SCP that are associated with active links in that set. Consequently, if conversational transactions were to be processed in the replicated FE-BE architecture, then the particular ("starting") BE processor that starts processing the transaction and generates the first conversational message will generally not be the BE processor that will process the answer to that conversation or all the remaining conversational messages in the transaction. Inasmuch as the state ("context") of the transaction will be stored in a database associated with the starting BE processor, none of the other BE processors will be able to associate a conversational message with this transaction and appropriately continue processing this transaction. Consequently, once a packet that forms this transaction reaches any BE processor other than the starting BE processor, the former BE processor will likely discard the transaction. As such, the SCP will not provide the caller with a desired enhanced service. The same result follows if a BE processor fails and the transaction must be taken over by another BE processor.

Hence, an SCP in its present form and based on the replicated FE-BE architecture is not suited to handling conversational transactions. For that reason, such an SCP would be generally unable to provide certain enhanced network services, such as PVN, that require an interactive conversation with a caller.

Thus, a need exists in the art for a method for handling conversational transactions in a distributed processing environment, particularly one suited for use in real time fault tolerant transaction processing system employed in an SCP. Use of such a method will advantageously enable an SCP that utilizes a replicated FE-BE architecture to provide enhanced network services that require the collection of successive pieces of information on an interactive basis from a caller.

SUMMARY OF THE INVENTION

The inability of certain distributed processing systems to handle conversational transactions is advantageously eliminated by use of the present invention. In particular, in a distributed processing system having at least an originating node and a responding node connected through a communication path, wherein the responding node comprises a plurality of processors and a memory device and where each of these processors is capable of accessing information from a corresponding database residing within the memory device, the inventive method involves: storing context information for an associated conversational transaction using a first processor situated within the responding node wherein the context information is stored at a pre-defined address in a first database residing within the memory device and associated with the first processor; producing a first message using the first processor for transmission from the responding node over the communication path to the originating node wherein the first message contains a first transaction identifier field having a value that corresponds to the pre-defined address; generating within the originating node a second message for transmission from the originating node over the communication path to the responding node wherein the second message contains a second transaction identifier field having substantially the same value as the first transaction identifier field; and accessing the record using a second processor located within the responding node in response to reception of the second message at the second processor by generating the pre-defined address within the second processor using the value of the second transaction identifier field so as to permit the second processor to incrementally process said conversational transaction within the responding node.

Specifically, use of the present inventive method advantageously provides conversational transaction processing capability to an SCP that employs a replicated FE-BE architecture and a shared file structure residing on a shared memory device, e.g. a shared disk farm. Through this method, a "starting" back end processor that begins processing a current conversational transaction within the SCP stores context information regarding this transaction in a record located at a pre-defined address on a particular file associated with this processor and residing on the shared memory device. Thereafter, this processor embeds this address as a value of a transaction identifier within a TCAP conversational message that will be subsequently transmitted by the SCP back to an SSP. This conversational message contains both a transaction identifier, here a specific address value, and an op-code that instructs the SSP to provide a particular item of information defined by an appropriate customer record. By virtue of the SS7 protocol, the SSP copies the value of the transaction identifier it received into a subsequent TCAP conversational message that it will then send back to the SCP. This conversational message also includes the item of information requested by the SCP. Now, whenever any back end processor on the SCP receives this subsequent conversational message, regardless of whether that processor is the starting back end processor or not, that processor uses the value of the address embedded within the transaction identifier to access the context information stored within the corresponding record from a database associated with the starting back end processor. With the accessed context information and the additional information provided by the SCP, this back end processor can incrementally process the transaction. As a result of this incremental processing, this back end processor, as defined by the customer record, will either produce a response message to the SSP to appropriately route a call or a conversational message containing an appropriate op-code to instruct the SSP to provide additional information for subsequent incremental processing of the current conversational transaction. In the event a conversational transaction contains several conversations, then each back end processor in the SCP that incrementally processes the transaction will appropriately update the record to reflect the new state of the transaction prior to transmitting a conversational message to the SSP.

Through use of the inventive method, handling of conversation transactions can be advantageously facilitated in substantially any distributed processing environment that has a shared file system, a mechanism that distributes packets (or messages) among individual processors in the system and permits application specific identifiers to be embedded in the distributed packets (or messages).

BRIEF DESCRIPTION OF THE DRAWING

The teachings of the present invention can be readily understood by considering the following detailed description in conjunction with the accompanying drawing, in which:

FIG. 2 shows the correct alignment of the drawing sheets for FIGS. 2A and 2B;

FIGS. 2A and 2B collectively depict a block diagram of SCP 200 shown in FIG. 1;

FIG. 6 shows the constituent parts of a SS7 TCAP message;

FIG. 7 shows the use of a pre-defined address placed in the transaction identifier field by SCP 200 and the relationship of this address to a specific record stored within a context file at this SCP according to the teachings of the present invention;

FIG. 8 shows the correct alignment of the drawing sheets for FIGS. 8A and 8B;

FIGS. 8A and 8B collectively and diagrammatically show an illustrative message flow that could occur within SCP 200 whenever my inventive method is used in processing the conversational transaction depicted in FIG. 4;

FIG. 9 shows a flowchart of CREATE Routine 900;

FIG. 10 shows a flowchart of LOCATE Routine 1000;

FIG. 11 shows the correct alignment of the drawing sheets for FIGS. 11A and 11B;

FIGS. 11A and 11B collectively show a flowchart of OPEN Routine 1100;

FIG. 12 shows a flowchart of CLOSE Routine 1200;

To facilitate understanding, identical reference numerals have been used to designate identical elements, with certain exceptions noted below, that are common to the figures.

DETAILED DESCRIPTION

The teachings of the present invention can be used to impart conversational transaction processing ability to a wide variety of real-time distributed processing systems. For the sake of brevity, the present invention will be discussed in the context of a real-time fault tolerant transaction processing system that is used in a service control point (SCP) that implements the signalling system 7 (SS7) protocol in a telephone signalling network. Such a system processes packets supplied over any link existing within a link set in the network that connects a signalling transfer point (STP) to the SCP. Clearly, after reading the following description, those skilled in the art will readily appreciate how the teachings of the present invention can be incorporated into other distributed processing systems to readily impart conversational transaction processing capability therein.

To clearly understand the basic operation of a telephone signalling network and the advantages conveyed by the present invention, the following discussion will first discuss salient aspects of the network and primarily center on one of the simplest network services: 800 number calls. Next, the discussion will turn to addressing a limitation that exists in this network which effectively prevents enhanced network services, such as private virtual networks (PVN), from being readily provided. Thereafter, the discussion will conclude with a detailed explanation of the present invention and the manner by which it advantageously allows this network to easily provide these enhanced network services.

I. Common Channel Signalling Network

Figure 1:
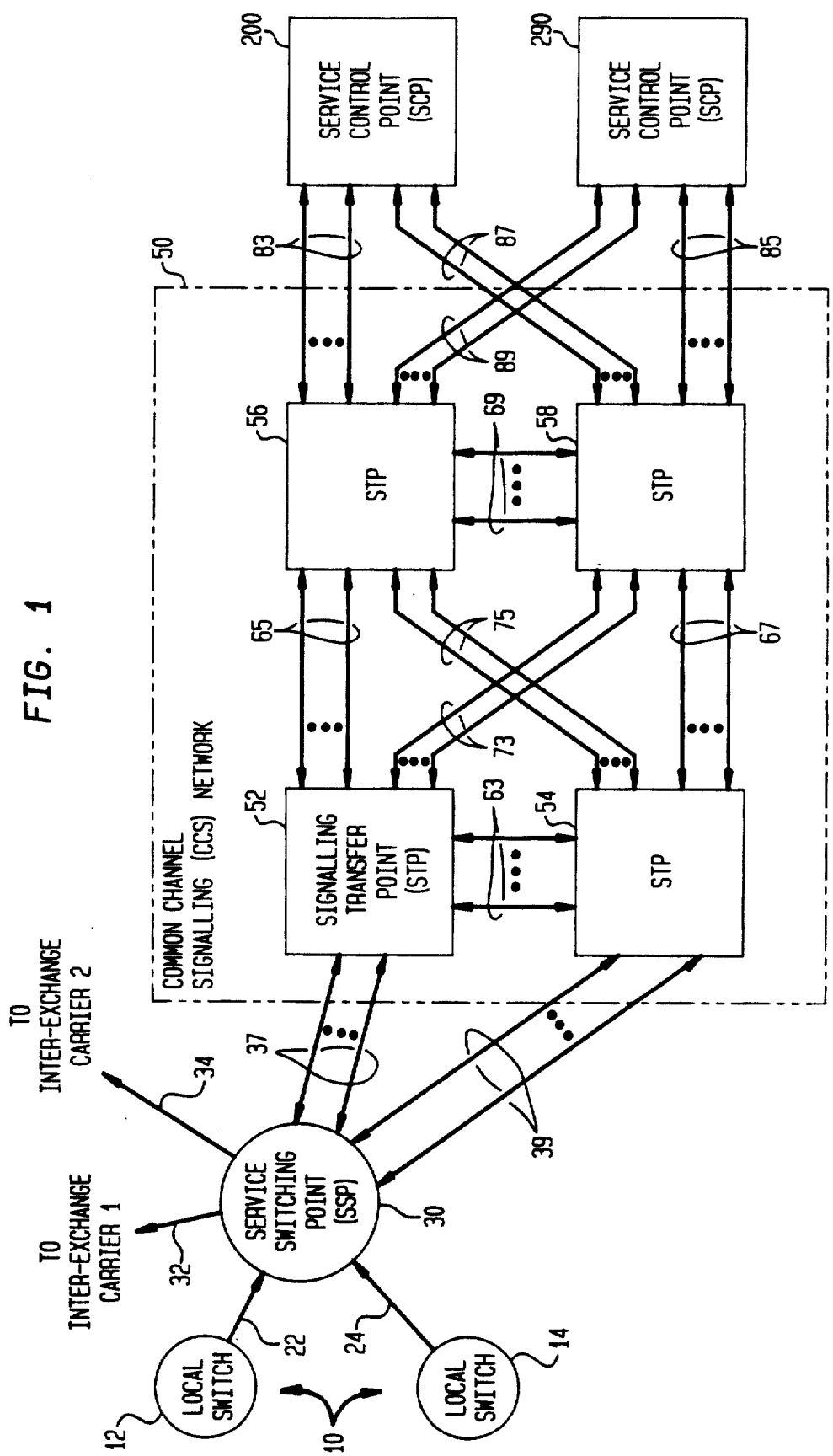
FIG. 1 is a simplified diagram of the architecture of the telephone signalling network that utilizes signalling system 7.

In particular, FIG. 1 shows a simplified diagram of an illustrative architecture of a telephone signalling network that utilizes signalling system 7 (SS7), employs transaction processing and is described in detail in Boese et al U.S. patent application, "A REAL-TIME FAULT TOLERANT TRANSACTION PROCESSING SYSTEM", filed Nov. 25, 1987, Ser. No. 07/125,463 now abandoned and succeeded by continuation application filed Dec. 12, 1989, Ser. No. 07/453,042 both of which are currently owned by the present assignee.

In general, this network provides special telephone call destination routing information to support a variety of special network services, such as illustratively 800 service and calling card calls. This information is obtained through remote database translations, using caller supplied information such as a called number or a credit card number, to appropriately access one or more databases that are embedded within a telephone signalling network.

Now, assume for the moment that a caller dials a call for a network service, such as an 800 number. The caller (not shown) is generally connected to a local switch, such as local switch 12 or 14. An 800 telephone number is actually a logical telephone number. To route such a call to its proper destination, the 800 number must be translated to an appropriate destination routing number to which the call can be subsequently routed. The specific destination routing number is specified in a customer record stored within one or more databases residing within a service control point (SCP). This record typically contains one and often more destination routing numbers and associated inter-exchange carrier selections that are associated with a dialed 800 number and the manner in which one of these destination routing numbers and its associated inter-exchange carrier is to be selected, e.g. time of day, day of month, originating numbering plan of the caller and the like. An SCP is an on-line real time fault tolerant transaction processing system that provides call processing information (responses) in response to queries received via STPs connected within the signalling network. This call processing information includes call routing instructions, and for enhanced network services, as discussed below, instructions to obtain additional information from a caller. In particular, several different database applications can be concurrently executing on an SCP. To understand the operation of the network, the following discussion addresses one such application, 800 service.

Whenever a local switch, typified by either local switch 12 or 14, receives an 800 call, this switch routes the call onward, either through trunk 22 or through trunk 24, respectively, to an equal access switch, located either at a local office or elsewhere, that has service switching point capability (such a switch will be collectively referred to as an "SSP"), such as SSP 30. The function of the SSP is to first recognize an incoming call as one that requires special handling—such as 800 number calls, then suspend normal call processing for this call, thereafter obtain appropriate routing instructions through the telephone signalling network and finally route the call according to the resulting instructions. Specifically, in response to an 800 number call, SSP 30 fabricates a query in the form of a packet. This query contains the called 800 number and a request for a destination routing number associated with the dialed 800 number and a designation of a specific inter-exchange carrier, such as inter-exchange carrier 1 or 2, that is to carry this call. This packet also contains a network address of the SSP, i.e. SSP 30, that originated the query. Once this packet is generated, it is transmitted through regional common channel signalling (CCS) network 50 to an appropriate SCP, such as SCP 200 or SCP 290, which processes the packet and provides the desired routing information as a response message. Inasmuch as the transactions associated with 800 calls merely contain a query and a subsequent response, they can be viewed as "Query—Response" type transactions. Other transactions which are associated with enhanced network services, such as PVN, additionally contain one or more interactive conversations between an SCP and an SSP, and, as discussed in detail below, take the form of "Query—Conversation—. . . —Conversation—Response".

Generally speaking, the CCS network consists of a multi-level hierarchy of signalling transfer points (STPs) which primarily act as packet switches to: carry a message, in this case an SS7 packet, from an "originating" SSP to a particular "destination" SCP; carry, when appropriate for enhanced network services, one or more conversational messages between the destination SCP and the originating SSP; and then carry a packet containing a response message (call routing instructions) from that SCP back to the originating SSP which, in turn, routes the call according to the call routing instructions. As shown, CCS network 50 contains STPs 52, 54, 56 and 58 which are situated at different geographic locations within a given service region. STPs 52 and 54 receive incoming packets from SSP 30 for subsequent routing through the CCS network. As a result, these STPs function as "originating" STPs. STPs 56 and 58 receive incoming packets that have been routed through CCS network 50 for delivery to SCP 200 or 290 for appropriate processing therein. As such, STPs 56 and 58 function as "destination STPs".

In actuality, CCS network 50 typically contains more than two originating and two destination STPs, and more than two STP levels wherein one or more levels of STPs are situated between the originating and destination STPs to provide additional packet routing therebetween. Each individual SSP, STP and SCP that exists within a signalling network is often referred to as a node.

In conjunction with this network, a multi-layered protocol is used to provide point-to-point communication between different nodes in the signalling network—such as between an SSP and an STP, between separate STPs, and between and STP and an SCP. This protocol, hereinafter referred to as signalling system 7 (SS7), is the ANSI (American National Standards Institute) implementation, as recommended by the ANSI T1X1.1 Working Group, of the signalling system 7 standard initially promulgated by CCITT. This protocol includes mechanisms, such as error detection and correction, to insure reliable transfer of signalling information between two points in a CCS network in the presence of transmission disturbances or a network (link or node, e.g. STP or SCP) failure. In implementing this protocol, each pair of nodes is inter-connected by a number of separate signalling links, specifically up to sixteen separate bi-directional physical links, that collectively form a link set. In the case of a link failure, the protocol diverts and distributes traffic from a failed link in the set to and approximately equally among all the remaining active links in the set. The software that implements SS7 executes in every node within the network in order to reliably transfer packets therebetween.

Within this protocol, levels one, two and three respectively define appropriate physical, electrical and functional characteristics of a signalling data link; functions and procedures relating to transferring signalling messages over an individual signalling link (e.g. delimitation of signalling units by flag insertion, error detection using check bits and explicit sequence numbers); and software based transport mechanisms and procedures that are common to and independent of the operation of individual signalling links. Application messages, such as queries to an SCP and responses therefrom, which pass between different nodes within a CCS network exist at the fourth (and when used higher) levels of the SS7 protocol which is referred to as the transaction capability application part (TCAP). Inasmuch as the inventive method utilizes capabilities that reside within the TCAP layer, the remaining discussion as it pertains to SS7 will be limited to TCAP.

Specifically for use with SS7, SSP 30, as shown in FIG. 1, is inter-connected by link sets 37 and 39 to respective originating STPs 52 and 54 within CCS network 50. Within CCS network 50, originating STPs 52 and 54 are themselves inter-connected by link set 63 and are redundantly inter-connected to destination STPs 56 and 58 by link sets 65, 67, 73 and 75. STPs 56 and 58 are themselves inter-connected by link set 69 and are redundantly inter-connected to respective SCPs 200 and 290 by link sets 83, 85, 87 and 89. Each link set carries the same address. By virtue of the SS7 protocol, every node assigns outgoing packets among various active links in a link set so that these packets are distributed on an approximately even basis among all these links.

Once SSP 30 formulates a query, this SSP routes the associated packet that contains this query and appropriate header information through an available active link in either link set 37 or 39, to an originating STP, i.e. either STP 52 or 54, respectively, located within CCS network 50. The originating or any subsequent STP determines, using internal global title translation tables, an address of a particular SCP, such as SCP 200, which contains the appropriate databases necessary to provide the requested call routing instructions, e.g. the specific SCP which contains a copy of the customer record for a dialed 800 number. This address is then inserted as a routing field that forms part of the header of the packet. Thereafter, the packet is routed from the originating STP to a destination STP within CCS network 50. Each STP that receives this packet examines its routing field and routes the packet accordingly. Once the destination STP receives the packet, it routes the packet to the particular SCP specified within the header. To process an 800 call, the SCP performs an associated database look-up operation to formulate the desired call routing instructions. After this has occurred, the SCP fabricates a packet that contains both the call routing instructions as a response message and a header that specifies the address of the SSP that originated the original query. Once the SSP receives this packet, it routes the dialed 800 call according to the routing instructions, i.e. the SSP routes the dialed call to the specified destination routing number via a specified inter-exchange carrier, such as inter-exchange carrier 1 or 2, via respective trunks 32 or 34.

For a detailed explanation of SS7, the reader is referred to the following material: *Bell Communications Research Specification of Signalling System 7, Technical Reference TR-NPL-000246*, Issue 1, Volume 1, 1985 (©1985, Bell Communications Research) which is hereinafter referred to as the "Bellcore SS7 Specification"; and M. G. Walker, "Get inside CCITT signalling system No. 7", Telephony, Mar. 10, 1986, pages 72-77.

II. Service Control Point Architecture

Figure 2B:
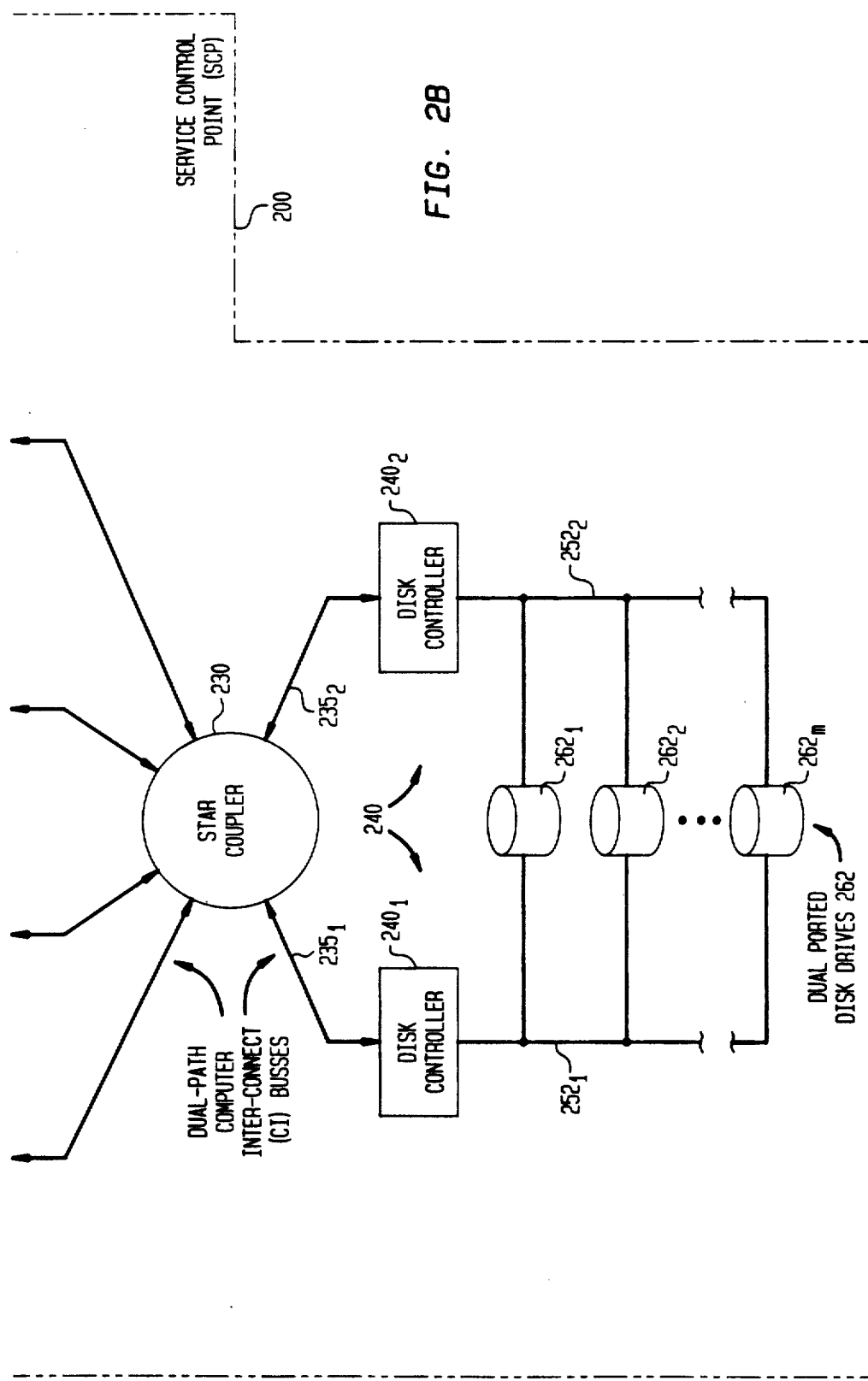

A block diagram of the architecture of an SCP, illustratively SCP 200, is depicted in FIGS. 2A and 2B, for which the correct alignment of the drawing sheets for these figures is shown in FIG. 2. This architecture is also described in detail in the above-noted pending U.S. patent application entitled "A REAL-TIME FAULT TOLERANT TRANSACTION PROCESSING SYSTEM" filed Nov. 25, 1987, assigned U.S. application Ser. No. 07/125,463 now abandoned and succeeded by continuation application filed Dec. 12, 1989, Ser. No. 07/453,042 both of which are currently owned by the present assignee.

As shown in FIGS. 2A and 2B, SCP 200 contains a cluster of processors (inter-connected front and back end processors) that appears to the CCS network as a single node. Essentially, SCP 200 consists of from three to five back end processors that process transactions using databases stored on a shared disk farm and provide appropriate responses to queries launched from SSPs. Each back end (BE) processor is connected to and communicates, via a corresponding front end (FE) processor, with CCS network 50 to receive individual incoming queries from the network, transmit and receive conversational messages to and from the network and transmit responses to the network. In processing 800 calls, each associated query is separately processed by a corresponding BE processor. All the front and back end processors are loosely coupled together for purposes of processor synchronization and re-assignment. One of the back end processors co-ordinates the operation of all the FE and BE processors so that individual front and/or back end processors as well as software, including application (subsystem) software, executing therein can be gracefully brought into and out of service. As a result of this co-ordination, SCP 200 appears as a single node to the CCS network, specifically STPs 56 and 58, even though different packets (e.g. containing different queries) arriving on different links connected to the SCP may, in fact, be processed essentially simultaneously by different processors. As a result of packet distribution occurring among all the active links in a link set, all these links simultaneously carry an approximately equal number of packets which are, in turn, processed by all the FE-BE processor pairs connected thereto. In the event any physical link in a link set or either a FE or BE processor connected thereto fails, then that link is declared to be out of service by the SS7 protocol. As a result, the SS7 protocol merely re-distributes all subsequent traffic (packets) approximately evenly among all the remaining active links in the set until such time as the fault is cleared. When the previously failed link is brought back into active service, the protocol once again re-distributes packets on an approximately even basis among this link and the others. As the result of this packet re-distribution, there is advantageously no need to connect a fault tolerant processor to each physical link as either the FE or BE processor.

As shown and discussed above, SCP 200 is connected to STPs 56 and 58 by respective link sets 83 and 87. Link set 83 contains multiple links $83_1, 83_2, 83_3, \ldots, 83_n$. Link set 87 contains multiple links $87_1, 87_2, 87_3, \ldots, 87_n$ (where "n" $\leq 8$). Within SCP 200, every pair of corresponding links in both link sets is connected to a separate processor within FE processors 210. In this manner, each front end processor services incoming packets appearing on two links. Specifically, front end processors 210 consist of front end processors $210_1, 210_2, 210_3, \ldots, 210_n$, which, are in turn, respectively connected to links $83_1$ and $87_1$, $83_2$ and $87_2$, $83_3$ and $87_3, \ldots, 83_n$ and $87_n$. The front end processors are all identical. Each front end processor, which will be discussed in greater detail below in conjunction with FIG. 3, contains a MicroVAX-II computer manufactured by Digital Equipment Corporation (which also owns the trademark "MicroVAX-II"). Each front end processor executes layers 3 and below of the SS7 protocol including a message transfer part and a signalling connection control part.

Each FE processor is, in turn, connected through a well-known ETHERNET link (hereinafter referred to as a "dedicated" ETHERNET link) to a corresponding one of back end processors 220 (ETHERNET is a registered trademark of Xerox Corporation). Alternatively, for added redundancy and performance, the SCP can be configured with each FE processor connected through a dedicated ETHERNET link to all of the BE processors. However, for purposes of simplicity, each FE processor will be shown and described as being connected to a single corresponding BE processor through its associated dedicated ETHERNET link. Each dedicated ETHERNET link is shown using a dot-dashed line in order to distinguish this ETHERNET connection from administrative ETHERNET network 212 and its inter-processor connections, which will be discussed below. Specifically, front end processors $210_1, 210_2, 210_3, \ldots, 210_n$, are connected through ETHERNET links $216_1, 216_2, 216_3, \ldots, 216_n$, on a one-for-one basis to BE processors $220_1, 220_2, 220_3, \ldots, 220_n$, respectively. All the back end processors are identical with each consisting of a VAX 8600 processor which is also manufactured by Digital Equipment Corporation (which also owns the trademark "VAX"). Each of the dedicated ETHERNET links is controlled by appropriate communications software executing in both the front and back end processors connected to either side of the link. This communications software forms part of the DECnet family of communications products available from Digital Equipment Corporation (which also owns the registered trademark "DECnet"). All the application layers of SS7, collectively called the TCAP application layer, as discussed below, are executed within the back end processors.

To process incoming queries for network services, all back end processors 220 are able to access disk resident databases containing customer records. Specifically, back end processors $220_1, 220_2, 220_3, \ldots, 220_n$ are connected through individual paired busses, specifically high speed dual path computer inter-connect busses $225_1, 225_2, 225_3, \ldots, 225_n$, through star coupler 230, to dual path computer inter-connect busses $235_1$ and $235_2$. The computer inter-connect busses are controlled by appropriate communications software executing within the back end processors and disk controllers and available within the DECnet family of communications products. These inter-connect busses, in turn, are connected to disk controllers 240 formed of disk controllers $240_1$ and $240_2$. Star coupler 230 is a well-known passive device that can be used to physically inter-connect up to sixteen high speed digital devices consisting of processors and disk controllers. Disk controllers $240_1$ and $240_2$ are each preferably model HSC50 available from Digital Equipment Corporation. Each of the controllers, specifically controllers $240_1$ and $240_2$, is connected through an appropriate bus, specifically bus $252_1$ or $252_2$, to one port of each disk drive $262_1, 262_2, \ldots, 262_m$, that forms paralleled disk drivers 262 (where "m" is an integer greater than zero). These disk drives collectively form a shared disk farm and contain data files consisting of databases containing the necessary customer records sufficient to support various network services that rely on remote processing provided by SCP 200. Each of the data files stored on the disks is arranged with multiple copies using a well-known "shadowing" technique to allow simultaneous access to multiple copies of the data and provide real time recovery in case of a failure of a disk drive, a disk itself or a disk controller. Multiple copies of the data files are also stored within each disk to improve access speed and provide increased system reliability.

All the front and back end processors are connected via separate ETHERNET local area network 212, which is referred to as an "administrative" ETHERNET local area network (LAN). This local area network permits communication to occur between the processors in order to provide synchronization and co-ordination therebetween. Specifically, administrative ETHERNET network 212 is connected to front and back end paired processors $210_1$ and $220_1$, $210_2$ and $220_2$, $210_3$ and $220_3, \ldots, 210_n$ and $220_n$, via respective leads $212_1, 212_2, 212_3, \ldots, 212_n$. This network uses the BX.25 protocol and is also controlled by appropriate communications software that forms part of the DECnet family of communications products. This network utilizes token passing. Specifically, a message is placed onto this network by a sending site, for example front end processor $210_1$. This message is then picked up by an adjacent site on the network, e.g. front end processor $210_2$. If the message is not for the latter front end processor but instead is destined for a downstream site, then the adjacent site that received the message, here front end processor $210_2$, will place the message back onto the network for reception at the next adjacent site, i.e. front end processor $210_3$ and so on. The message repeatedly appears on the network as the message travels from site to site. Whenever the message finally reaches its destination site, the message will not be re-transmitted and hence effectively "pulled" off the network. As will be discussed below, the processors that form the SCP are synchronized and co-ordinated through various software processes that execute on one of the back end processors at any given time. These processes executing on one back end processor, e.g. back end processor $220_1$, communicate with all the other processes via administrative ETHERNET network 212. This communication generally involves application level commands to other back end processors to gracefully bring up or remove a certain application, such as 800 call processing, calling card, PVN or the like, at other back end processors or invoke a mate switch operation to another SCP. In addition, all the front end processors can also communicate to each other via administrative ETHERNET network 212. These communications illustratively involve inquiries (changeover requests) regarding available links in the event of a link failure and accompanying acknowledgements (changeover acknowledgements), as well as other network management messages.

In addition, to provide a primary port through which craftspersons and/or technicians can locally manage the SCP, administrative ETHERNET network 212 is connected to maintenance and operations sub-system 270. This sub-system, typically a VAXstation II/GPX workstation produced by Digital Equipment Corporation (which also owns the trademark VAXstation II), is a multi-tasking workstation that is used to provide a system operator with simultaneous access to multiple processes executing within the SCP, such as status, configuration and re-configuration processes, performance data and alarm information. The information provided by sub-system 270 is displayed to a system operator. Similarly, the system operator can enter commands into SCP 200 through a well-known keyboard (not shown) that forms part of sub-system 270. Additionally, server 282 is connected to administrative ETHERNET network 212 to provide a simple interface for terminal 284 for communicating with any single task then executing within the SCP, e.g. run a single diagnostic within any processor or update a file and the like. Support system processor 272 is also connected to network 212 and is used to collect and disseminate, upon command, various SCP system statistics from each processor, such as utilization of each front and back end processor, number of failures of each such processor and/or of each application and the like. Processor 272 is also a MicroVAX-II processor provided by Digital Equipment Corporation.

Figure 3:
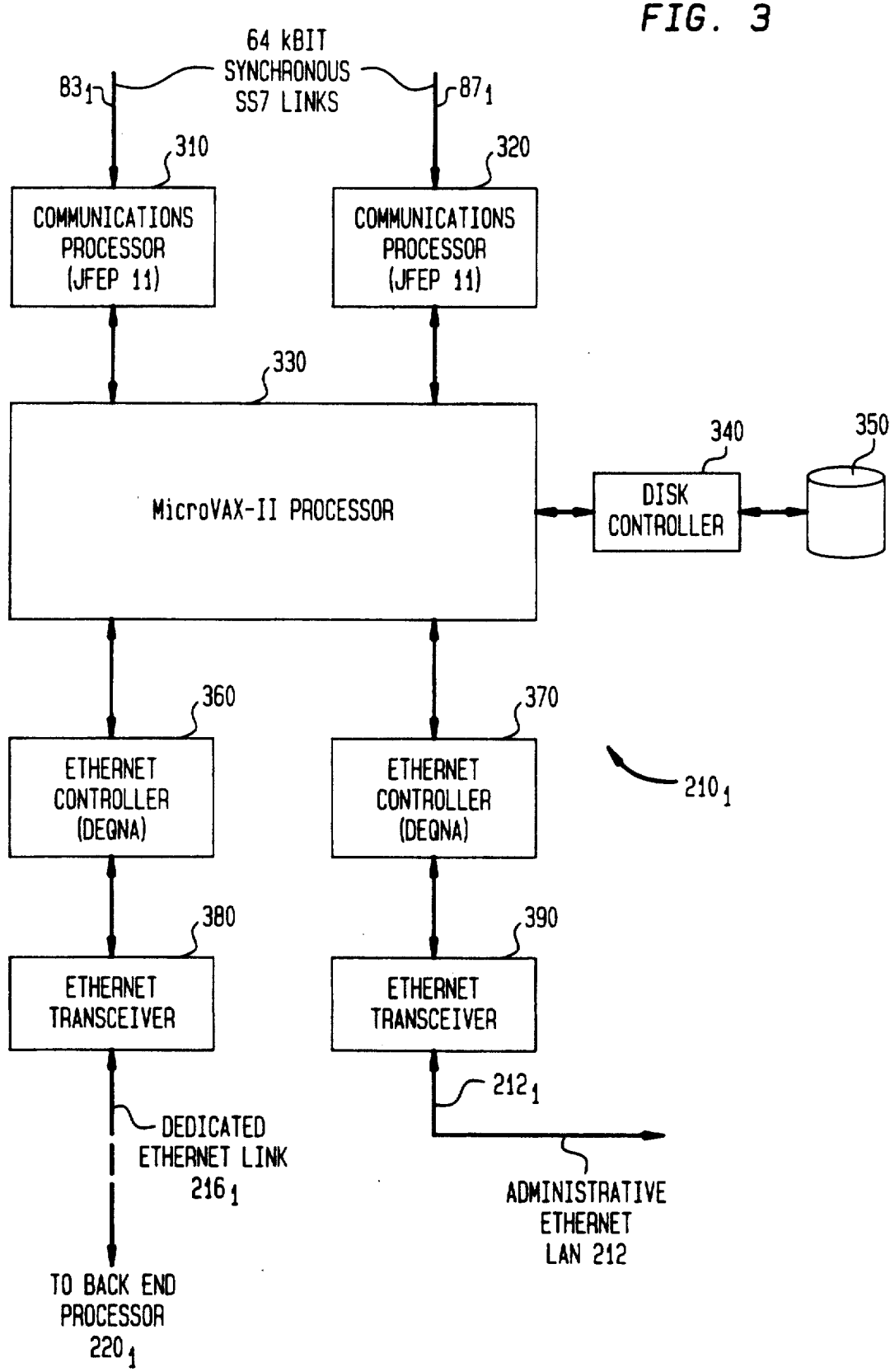
FIG. 3 depicts a block diagram of front end processor 210₁ situated within SCP 200 shown in FIGS. 2A and 2B.

FIG. 3 depicts a block diagram of any front end processor, such as processor $210_1$, situated within SCP 200 shown in FIGS. 2A and 2B. As shown in FIG. 3, the front end processor consists of MicroVAX-II processor 330 that is interfaced to each of two 64 kbit synchronous SS7 links $83_1$ and $87_1$ through a separate communications processor 310 and 320, respectively. Both communications processors are identical. Specifically, each communications processor is a model LSI-JFEP 11 general purpose front end processor currently available from MDB Systems, Inc. of Orange, Calif. The communications processors relieve host MicroVAX-II processor 330 of the task of directly interfacing to the synchronous links by providing, on transmission of any message, well-known framing functions including, for example: flag generation for frame delineation (message delimiting), zero bit insertion (bit stuffing) for data transparency, and computing a frame check polynomial to generate various check bits for each message and insertion of these check bits into each message. Upon reception of any message, each communications processor searches for and strips message delimiting flags; searches for and deletes stuffed zero bits; and checks for framing errors by locally computing check bits through a cyclic redundancy code for each received message, then comparing the received check bits against the locally computed values therefor and finally generating appropriate error messages should a framing error occur. These processors also provide well-known clocking functions. Each of these processors also detects signal loss (SS7 level 1 errors) on its associated link. Furthermore, these processors generate and transmit fill-in signal unit (FISU) messages on each link whenever the link is not being used to carry any other messages, such as link status signal units (LSSUs) and message signal units (MSUs) used in the SS7 protocol.

Host MicroVAX-II processor 330 is also connected through disk controller 340 to disk drive 350. The disk controller and disk drive are preferably models RDQX2 disk controller and RD52 31 Mbyte Winchester disk drive, both of which are available from Digital Equipment Corporation. The disk drive is presently used to store diagnostic software. Inasmuch as diagnostic procedures could be downloaded to host processor 330 over administrative ETHERNET network 212 in lieu of being stored locally at each front end processor, this disk drive and its associated controller could be eliminated from the front end processor with attendant cost savings if the diagnostics were to be remotely stored.

To permit front end processor $210_1$ to communicate with its associated back end processor $220_1$ and with the other processors within SCP 200 (see FIGS. 2A and 2B), host MicroVAX processor 330 is connected, as shown in FIG. 3, via ETHERNET controllers 360 and 370 and respective ETHERNET transceivers 380 and 390 to dedicated ETHERNET link $216_1$ and, via lead $212_1$, to administrative ETHERNET local area network 212. Each ETHERNET controller is a model DEQNA controller available from Digital Equipment Corporation. Each of these controllers implements the data link and physical link protocols specified by the ETHERNET standard (standard 803.2 promulgated by the Institute of Electrical and Electronics Engineers). The ETHERNET transceivers are well-known bi-directional hardware receiver/transmitters that provide signal shaping and appropriate amplification.

The replicated FE-BE architecture provides excellent fault tolerant performance for simple "Query—Response" type transactions. Such a transaction is typified by one, as discussed above, in which a query, such as an 800 call query, is sent out by an SSP to an SCP and a needed response, i.e. the destination routing information, is furnished through a single database access and then sent by the SCP back to the SSP. Unfortunately, not all transactions that require SCP processing are quite so simple.

In particular, for certain enhanced network services, such as those needed to implement a private virtual network (PVN), the transactions would be much more complex than simple "Query—Response" type transactions. Specifically, these services often require a caller to enter information, in addition to the called number, on an interactive basis before the SCP can fully process the call. A typical conversational transaction that would be expected to occur in PVN service is diagrammatically shown in FIG. 4.

Specifically, for PVN service, caller 100 would dial an associated telephone number, this action symbolized by dashed line 41, to gain access through local switch 12 or 14 (not shown for purposes of simplifying the drawing) to the PVN service. When the call reaches SSP 30, the SSP would then launch an SS7 packet, here designated by a circled letter "A", containing a query to SCP 200 to obtain appropriate routing information therefrom. After the receipt of this query, SCP 200 performs database access operation 91 into a customer record (not shown) to specify the next item of information, here a personal identification number and an authorization code, that has to be obtained from the caller. Once this occurs, SCP 200 sends a conversational message within an SS7 packet, here designated by a circled letter "B", to SSP 30 to instruct the SSP to synthesize a predetermined voice announcement through the local switch to caller 100 and then collect the resulting digits entered by the caller. To accomplish this, SCP 200 inserts an appropriate op code within a TCAP conversational message, and then transmits this message as a SS7 packet, designated by the circled letter "B", via CCS network 50 back to SSP 30. In response to this conversational message, SSP 30 generates an appropriate announcement, here symbolized by dashed line 43, to prompt caller 100 to enter the desired digits. Once caller 100 enters the necessary digits for his personal identification number and authorization code, as symbolized by dashed line 45, SCP 30 assembles an appropriate TCAP conversational message and transmits it as an SS7 packet, here designated by a circled letter "C", back to SCP 200. In response to this message, SCP 200 then performs database access operation 93 into the customer record in order to specify the next piece of information requested from caller 100. The resulting request is sent as a conversational TCAP message within an SS7 packet, designated by a circled letter "D", back to SSP 30. Upon receiving this message, SSP 30 generates an appropriate announcement, symbolized by dashed line 47, through the local switch to prompt caller 100 to enter the information which, in turn, is transmitted back to SCP 200 as part of an appropriate TCAP conversational message within a SS7 packet. This iterative conversational process continues until the caller is prompted to enter the last piece of information specified by the customer record. Once the caller enters this last piece of information, here symbolized by dashed line 49, it is transmitted as a TCAP conversational message within an SS7 packet designated by a circled letter "P". Once this last conversational message has been received by SCP 200, the SCP will then perform database access operation 95 into the customer record through which the SCP will determine that it can now provide appropriate destination routing information for the call. At this point, SCP 200 will generate the routing information as symbolized by block 97 to provide the desired enhanced service to the caller. SCP 200 will then embed this destination routing information within a TCAP response message that will be transmitted as SS7 packet, here depicted by a circled letter "Q", to SSP 30. Once the SSP receives this response message, it will then route the call accordingly. The number of separate conversational messages exchanged between SSP 30 (and caller 100) and SCP 200 will depend upon the specific required information defined by the customer record.

Unfortunately, the replicated FE-BE architecture shown in FIGS. 2A and 2B is not suited for readily processing conversational transactions. This is clearly evident from FIG. 5 which shows illustrative message flow that could occur within SCP 200, in the absence of using applicant's inventive method, in processing the conversational transaction depicted in FIG. 4 for PVN service.

As noted above, incoming packets from STP 56 to SCP 200 are distributed by the SS7 protocol among individual physical links $83_1, 83_2, \ldots, 83_n$ that are then active within link set 83 to corresponding FE-BE processor pairs. As noted, each FE processor, e.g. FE processor $210_1$, through SS7 Protocol Processing operation 512 processes layers 1, 2 and 3 of both an incoming SS7 packet to yield an associated TCAP message for subsequent processing by a corresponding BE processor, e.g. BE processor $220_1$, and of an outgoing TCAP message supplied by this BE processor to yield an associated outgoing SS7 packet. To process a TCAP message, each BE processor accesses a corresponding set of transaction databases located within disk drives 262. Specifically, BE processors $220_1, 220_2, 220_3, \ldots, 220_n$ access corresponding transaction database sets $560_1, 560_2, 560_3, \ldots, 560_n$ that collectively form databases 560 through respective software links $541_1, 541_2, 541_3, \ldots, 541_n$ that collectively form links 541. Although communication between each BE processor and its corresponding transaction database set would occur, as shown in FIGS. 2A and 2B, through dual path computer interconnect busses, star coupler 230, a disk controller and either bus $252_1$ or bus $252_2$ and would be controlled by appropriate disk access and control software, this communication is simply represented in FIG. 5 by a corresponding access path, specifically access paths $541_1, 541_2, 541_3, \ldots, 541_n$ respectively running between BE processor $220_1, 220_2, 220_3, \ldots, 220_n$ and transaction database sets $560_1, 560_2, 560_3, \ldots, 560_n$. Other databases, such as those which store customer records and translation tables, are also collectively stored within disk drives 262 and used by each BE processor. To simplify the figure, these other databases have been purposely omitted from FIG. 5. Each BE processor executes a set of service specific TCAP Processes, e.g. TCAP Processes 551 and 553 in corresponding BE processors $220_1$ and $220_3$, that parses the query from an incoming TCAP message and then routes the query to a specific one of several independent call processors, i.e. call processors $221_1, 221_2, \ldots, 221_m$ or call processors $223_1, 223_2, \ldots 223_m$, respectively, that execute in that BE processor. Each of these TCAP Processes also receives a response message from a corresponding call processor and then constructs an appropriate TCAP message that contains the response. Each call processor (CP) contains one or more specialized software routines and supports a different network service, e.g. one call processor, e.g. $CP_1$, exists for 800 service, another, $CP_2$, for PVN, another for calling card and so on. For increased redundancy and performance, multiple identical call processors can be executing on the same BE processor to provide the same service. However, to simplify the drawing and the ensuing discussion, only one call processor will execute on each BE processor to provide each service. Typically, each call processor executing on a BE processor, e.g. call processors $221_1, \ldots, 221_m$ for BE processor $220_1$, utilizes a different corresponding transaction database within each set of transaction databases for that BE processor. However, each call processor executing within a BE processor can access any individual transaction database within its associated set of transaction databases, e.g., for BE processor $220_1$ any of call processors $221_1, \ldots, 221_m$ can only access any database within transaction databases $560_1$. To provide a requisite measure of fault tolerance, all of the call processors are executed on each BE processor. A call processor will utilize and specifically create entries, as discussed in detail below, in its transaction database only for those calls that require conversational processing. Transaction databases are not used in processing calls that require non-conversational, i.e. query-response type, processing.

Figure 4:
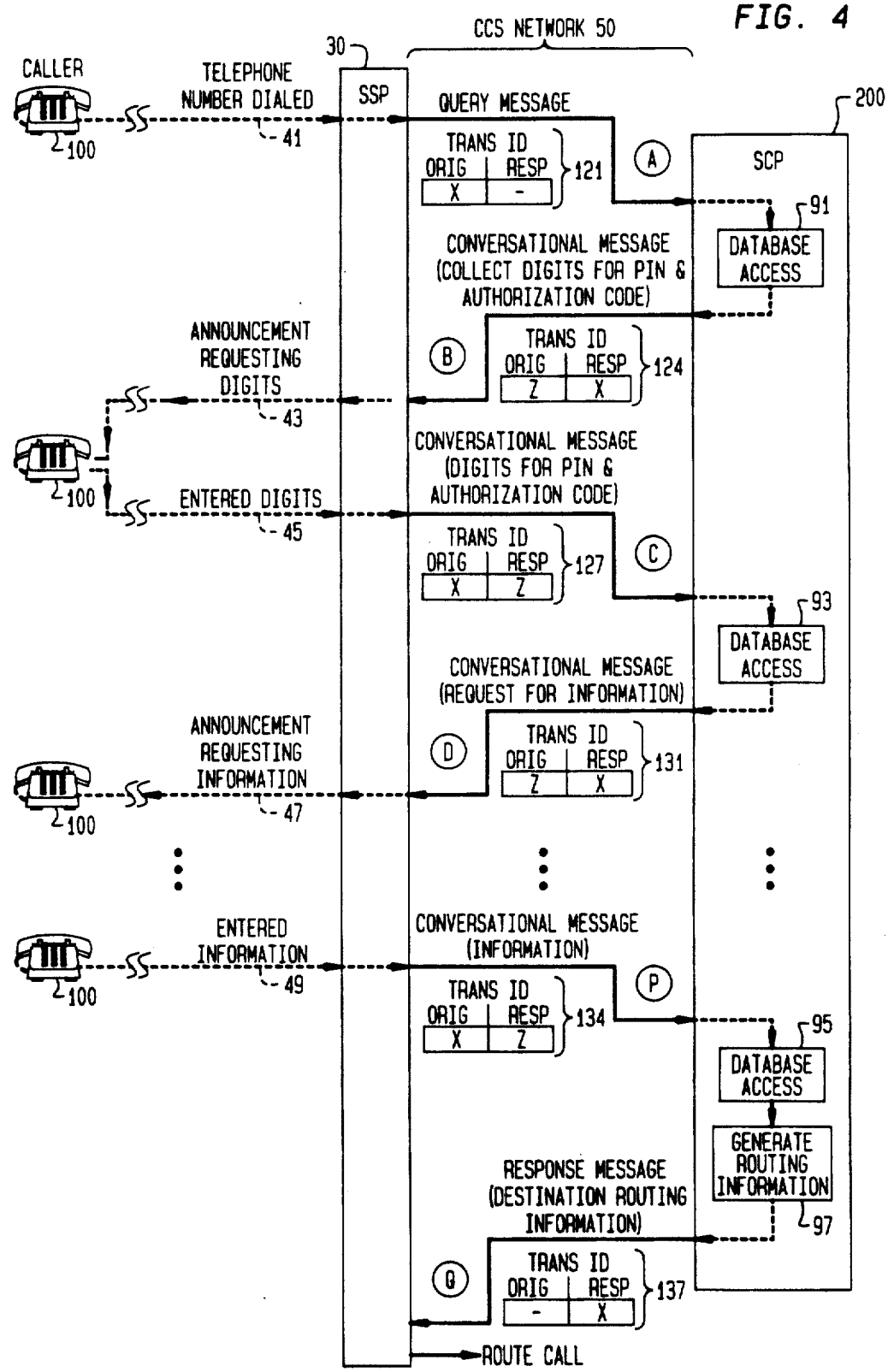
FIG. 4 diagrammatically depicts message flow that would be expected to occur between an SCP and an SSP during a typical conversational transaction.
Figure 5:
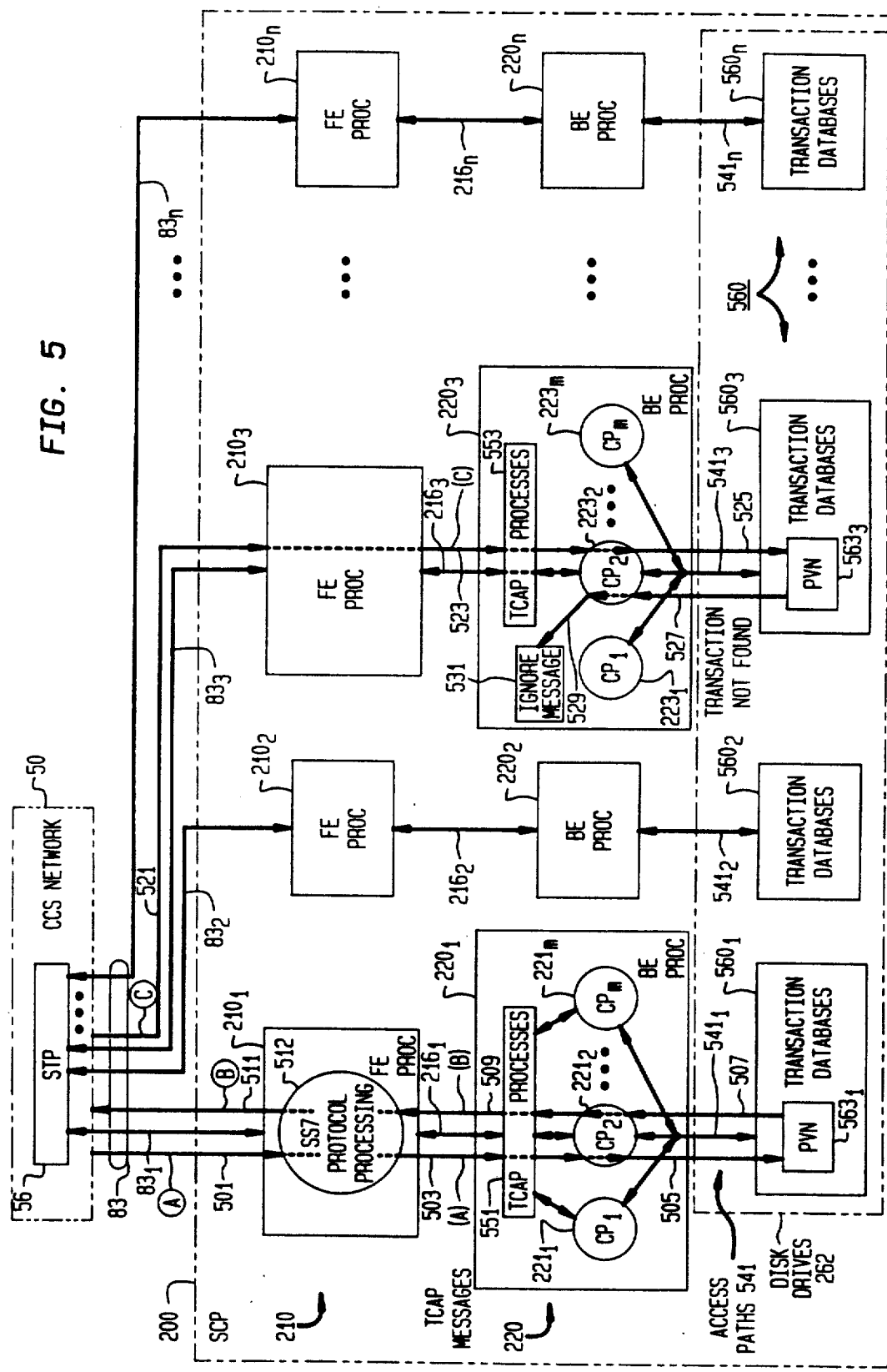
FIG. 5 diagrammatically shows an illustrative message flow that could occur within SCP 200, in the absence of using my inventive method, in processing the conversational transaction depicted in FIG. 4.

Now with this architecture, a typical conversational transaction, such as that shown in FIG. 4, would involve a series of incoming packets to SCP 200. As a result of packet distribution occurring over link set 83 by STP 56, these individual incoming packets would probably be scattered among some of the FE processors in SCP 200 that are associated with active links in set 83. Specifically, as shown in FIG. 5, STP 56 may route an incoming SS7 packet containing a query message, symbolized by the circled letter "A", over link $83_1$ to FE processor $210_1$ as symbolized by line 501. This FE processor will process layers 1, 2 and 3 of this SS7 packet and then send the TCAP query message, represented by "(A)", that is contained in this packet to BE processor $220_1$, as symbolized by line 503. TCAP Processes 551 executing within this BE processor will parse the query from the TCAP message and then route the query using its internal address to the PVN call processor, e.g. call processor $221_2$ (CP$_2$ within BE processor $220_1$). This call processor will then access, as symbolized by line 505, an appropriate customer record and begin processing the call. During the course of that processing, call processor $221_2$ will establish an appropriate entry for this call into corresponding PVN transaction database $563_1$ within transaction database set $560_1$. At each point during processing of the conversational transaction, this entry will store the "context" of the transaction which consists of the query and all accompanying information that has been received on an incremental basis up to that point for this transaction. As each successive item of information is received by the PVN call processor through a conversational message, the call processor will access and update the stored context accordingly. Once the last item of information defined by the customer record is received by the PVN call processor, then the context information is accessed and, using this last item of information, processed to provide a response message. Alternatively, the context could be the current depth within the customer record to which current call processing has reached, i.e. to define the next item of information that needs to be obtained from the caller, and other related call status information. In any event, PVN call processor $221_2$, in response to the information, here symbolized by line 507, provided by the customer record, specifically what piece of additional information now needs to be obtained from the caller, will fabricate a conversational message, which, in turn, will be transformed into a TCAP conversational message, represented by "(B)", by TCAP Processes 551 for eventual transmission to SSP 30 (see FIG. 4) to obtain this information. This TCAP conversational, message will be routed, as represented by line 509 in FIG. 5, back to FE processor $210_1$ which, in turn, will package this TCAP response message into a SS7 packet, represented by the circled letter "B", and transmit the packet over link $83_1$ to STP 56 for eventual forwarding to SSP 30.

After the SSP transmits the requested information in the form of a SS7 packet containing a conversational message, this packet is routed by CCS network 50 to STP 56 shown in FIG. 5. Because of packet distribution inherent in the SS7 protocol, STP 56 may likely route this packet, represented by the circled letter "C", over a different link than link $83_1$, such as illustratively link $83_3$. The incoming packet, symbolized by line 521, will be routed to FE processor $210_3$ which, in turn, will process layers 1, 2 and 3 of this SS7 packet and then send the TCAP conversational message, represented by "(C)", that is contained in this packet to BE processor $220_3$, as symbolized by line 523. TCAP Processes 553 executing within this BE processor will parse the query from the TCAP message and then route the query using its internal address to the PVN call processor, e.g. call processor $223_2$, (CP$_2$ within BE processor $220_3$). This call processor will then perform a database access into the PVN transaction database $563_3$ situated within transaction database set $560_3$. However, PVN transaction database $563_3$ will have no knowledge of the transaction processing that had previously occurred for this call. Specifically, there will be no entry for a transaction involving this call in PVN transaction database $563_3$ because the appropriate entry will instead reside within PVN transaction database $563_1$ located within transaction database set $560_1$. As such, call processor $223_2$, in response to not finding the transaction, as symbolized by line 527, will simply terminate its processing of the call, as symbolized by line 529 and block 531, and generate no further response. Consequently, all further processing of the transaction will cease without the caller gaining access to the PVN service.

Generally speaking, if conversational transactions were to be processed in the replicated FE-BE architecture shown in FIG. 5, then the particular ("starting") BE processor, e.g. BE processor $220_1$, that starts processing the transaction and generates the first conversational message will generally not be the BE processor, here BE processor $220_3$, that will process either the next conversational message provided by an SSP or all the remaining conversational messages in the transaction. Inasmuch as the context of the transaction will be stored in a specific transaction database, e.g. within PVN transaction database $563_1$, associated with a call processor executing on the starting BE processor, none of the other BE processors, such as BE processor $220_3$, will be able to associate a conversational message with the context for this transaction and appropriately continue processing this transaction. Consequently, once a packet that forms this transaction reaches any BE processor other than the starting BE processor, the former BE processor will likely discard the transaction. The same result follows if a BE processor fails and the transaction must be taken over by another BE processor.

Hence, due to packet distribution inherent in the SS7 protocol and an inability of each BE processor to route transactions to transaction databases associated with other BE processors, SCP 200 in its present form and based on the replicated FE-BE architecture is not suited to handling conversational transactions. For that reason, such an SCP would generally be unable to process conversational transactions and thereby be unable to provide certain enhanced network services, such as PVN, that require one or more interactive conversations between an SCP (for remote database processing) and a caller connected to an SSP.

III. Provisioning of Enhanced Network Services

This deficiency associated with the architecture of SCP 200 is advantageously overcome through use of my inventive method. Through this method, as described in detail below, a unique transaction identifier is placed within a protocol specific field available within a TCAP application message. A context file indexed by the value of this identifier is established within each BE processor. Inasmuch as the SS7 protocol reflects the value of this protocol specific field during each packet exchange, any BE processor, regardless of whether it is the starting BE processor or not, that receives a TCAP message containing such an identifier uses the value of the identifier as an address into the appropriate context file associated with the starting BE processor to advantageously provide incremental processing of a conversational transaction. Through use of this method, an SCP that employs the replicated FE-BE architecture can easily process conversational transactions and thereby readily provide enhanced network services.

Inasmuch as this inventive method involves the specific use of protocol specific fields available within TCAP messages and specialized context files as well as the use of various software routines for manipulating these files, the discussion will first examine the parts of a TCAP message that pertain to the inventive method, then turn to a discussion of the use of transaction identifiers in conjunction with such a context file, followed by an examination of the changed message flow occurring within SCP 200 through use of this method and then concluding with a description of these software routines.

Generally, as shown in FIG. 6, a TCAP message contains a transaction portion, such as transaction portion 605, followed by component portions 610, that contain one or more individual component portions 610$_a$, 610$_b$, ..., 610$_j$. Each portion is formed of a series of fields, with each field generally varying in size from one to four octets.

The transaction portion of a TCAP message specifies various attributes regarding the entire TCAP message; while each component portion carries a specific application message. Specifically, within the transaction portion, the Package Type Identifier field specifies the type of the current TCAP message; namely, a query, a conversational message, a response or a unidirectional message. A query, a conversational or a response message does not exist by itself in isolation. Instead, these messages collectively occur during transactional (internode) processing carried on between two separate nodes on the CCS network. Specifically, a query message generated at an initiating node, e.g. an SSP, is associated with a transaction that at a recipient node, e.g. an SCP, will subsequently produce either a response or a conversational message. By contrast, a unidirectional message, when transmitted, is the only message required for a certain operation to be processed and as such only exists in isolation. Inasmuch as no ensuing conversational or response messages result from processing a unidirectional message, then once a unidirectional message is transmitted, the initiating node can immediately end the transaction that produced that message.

Now, with this in mind, the Total TCAP Message Length field specifies the length in octets of the entire TCAP message. The Transaction ID Identifier is a standard valued code word, typically "C7" in hex, which specifies that transaction identifiers will follow. Through the use of transaction identifiers, a node on the CCS network that receives a TCAP message (queries, responses and conversational messages) can associate the current message with a specific transaction for a given application then being executed at that node. Inasmuch as a unidirectional message does not require inter-node transactional processing, unidirectional messages do not contain a Transaction ID. As such, the Transaction ID identifier and Transaction ID Length fields are both set to zero. The Transaction ID Length field specifies the length, in octets (zero, four or eight), of the following transaction ID fields. The Transaction ID field, when it appears, may contain one or two four octet transaction identifiers. For queries and responses, the transaction ID field contains, only one transaction identifier which has been specifically defined by the application which generated the message. Alternatively, for conversational messages, the transaction ID field contains two separate transaction identifiers in which each transaction identifier has been specifically defined by an associated application executing at each node on the network that is conducting a conversation. The values of the transaction identifiers are completely ignored by the SS7 protocol and merely passed by the SS7 protocol as part of an application message to the applications executing at the appropriate nodes.

Specifically, as indicated in FIG. 6, the transaction ID field may contain both an originating transaction identifier field followed by a responding transaction identifier field, both of which are four octets in length. For a query, the value of the originating transaction identifier is initially generated by the SSP that generated the query. For a response message, the responding SCP merely echoes (reflects) the value of the originating transaction identifier it received, as part of the corresponding query, as the responding transaction identifier within the response message. Queries and responses only contain originating or responding transaction identifiers, respectively, but not both. However, conversational messages contain both originating and responding transaction identifiers. The first conversational message going from the SCP to the SSP contains both of these transaction identifiers. The value of the originating transaction identifier in this first conversational message is an application specific value generated by an application executing at that node (e.g. the SCP) while the responding transaction identifier in this message is the reflected value of the responding transaction identifier that was embedded in the query message. In generating the next conversational message, the SSP reflects the responding transaction identifier as the originating transaction identifier and vice versa. Each subsequent conversational message contains these identifiers in the reverse position from that in the immediately preceding conversational message so that the subsequent message can be associated with the proper transaction in the node that will be receiving this message. A detailed explanation of the formats and codes of SS7 TCAP messages is provided in Q.773 section of the Bellcore SS7 Specification.

The use of originating and responding transaction identifiers is diagrammatically shown in FIG. 4. Here, a TCAP query message generated by SSP 30 typically contains transaction ID field 121. The application, e.g. PVN, executing at the SSP which generated the query message places an application specific value, e.g. "X" which is associated with the current PVN transaction in the originating transaction identifier field within transaction ID field 121. There is no value in the responding transaction identifier inasmuch as SCP 200 has not yet started processing this transaction and hence has not conveyed any corresponding application information to SSP 30. Now, once SCP 200 begins processing this transaction, then the first conversational message generated by the SCP typically contains transaction ID field 124. Specifically, the PVN application executing within the SCP would reflect the originating transaction identifier value "X" as the responding transaction identifier value and insert the value "Z" as the originating transaction identifier value within transaction ID field 124. The "X" and "Z" values would be subsequently reflected, by SSP 30, as the originating and responding transaction identifiers in transaction ID field 127 that is embedded within the next conversational message, and so on for transaction ID fields 131 and 134 that are embedded within successive conversational messages occurring between the SCP and the SSP. Once the response is generated by SCP 200, then transaction processing within the SCP is complete. As such, the TCAP response message only contains a responding transaction identifier field having a value "X" within transaction ID field 137.

Now, in accordance with my inventive method, a specific corresponding address is inserted as a corresponding originating and/or responding transaction identifier field by either an SSP or an SCP during transaction processing to specifically identify the location at which context information is stored for the transaction presently being processed at that node. The originating and responding transaction identifiers have the same structure, as explained in detail below. In particular, this address is generated by the appropriate call processor executing, within the "starting" BE processor and specifies the relative location in a specific context file associated with this BE processor at which specific context information for this transaction is stored and can subsequently be found. Since this address is reflected back to the same node that initially generated this address, any BE processor located within this node, regardless of whether it is the starting BE processor or not, can through use of this address access the appropriate file to extract and/or update the necessary context information during any stage of transaction (call) processing. Inasmuch as any BE processor within the SCP will now be able to access the proper context information for any transaction at any time during which it is being actively processed by that SCP, distribution of message packets among the active links connected to the SCP, as required by the SS7 protocol, will not adversely affect conversational transaction processing. As such, this technique advantageously permits an SCP that utilizes the replicated FE-BE architecture to provide enhanced network services that require conversational transaction processing.

Specifically, FIG. 7 shows the use of a specific address placed in the transaction identifier field by SCP 200 and the relationship of this address to a specific record stored within context file 720 at this SCP according to the teachings of the present invention. Context file 720 is stored within disk drives 262, shown in FIG. 5, and is associated with one of the call processors, e.g. PVN call processor $221_2$, that executes on one of the BE processors, e.g. BE processor $220_1$, located within this SCP. In the event that multiple identical call processors are used to provide any one service, then each of these call processors would have an associated context file residing on disk drives 262. A context file, such as context file 720, contains a separate record for each different transaction that its associated call processor, such as call processor $221_2$, is expected to handle during a given interval of time and under a worst case operating scenario. In particular, each SCP node, e.g. SCP 200, operates in conjunction with an identical mate SCP node, e.g. SCP 290, as shown in FIG. 1. In the event, one of these SCPs is taken down, then the entire call processing load being handled by that SCP is routed through the mate SCP. If worst case SCP operation involves processing illustratively 200 calls/second for each application with 10% of these calls requiring conversational transaction processing with a five minute worst case response time (latency) required to fully process each call, then each context file associated with that application must be sufficiently large to store context information for a total of 6000 separate calls, i.e. 6000 records. Now, if a 50% safety margin on file size is to be used, then each context file must be sufficiently large to hold 9000 records. With this in mind, context file 720 would have a capacity to hold approximately 9000 records, specifically records $730_0$, $730_1$, $730_2$, $730_3$, ..., $730_u$ (where u = 9000). In this case, since the worst case loading is the same for all applications, all context files stored within the SCP would have an identical organization and size. Naturally, if the worst case loading varied among the applications, then the context files can be sized differently for each different application.

To access a specific record stored within any context file, such as file 720 shown in FIG. 7, each transaction identifier field contains several specific fields that collectively contain a relative address to that specific record. Specifically, the transaction identifier is 32 bits wide with one bit, the most significant bit, (MATE bit <31>), designating whether the record is stored on SCP 200 (e.g. bit is set to a high value) or mate SCP 290 (i.e. bit is set to a low value), i.e. the transaction that utilizes this record originated on SCP 200 or its mate SCP. Inasmuch as an SCP does not have access to databases stored on its mate SCP, conversational messages that are destined for one SCP but received at its mate are simply ignored by the mate SCP, and vice versa. The next four significant bits, (BE_NUM bits <30:27>), specify a sequence number of the particular BE processor within the SCP that began processing the call, i.e. the starting BE processor. Since application software for any call processor executing on a BE processor within an SCP and associated databases can be updated under operating conditions through on-line storage of old and new versions and changeover therebetween, the next significant bit, (FILE VERSION bit <26>), specifies whether the desired record is stored on a new or old version of the associated context file. The following three significant bits, (CP NUM bits <25:23>), provide the number of the specific call processor on this BE processor that is processing the call. Together the BE_NUM, FILE VERSION and CP_NUM fields point to a specific context file, e.g. context file 720, executing within an SCP.

To locate a specific record within this file, the remaining 23 bits, ("tid" bits <22:0>), that are used in the transaction identifier contain a relative address, specifically an index value, that points to a specific record within this context file. The location for storing a record within a context file is determined by the value of circular index, e.g. index 740. As records are created, they are sequentially stored within a context file. As each record is stored, the value of a pointer (not shown) is appropriately incremented by one. Inasmuch as 23 bits are available as a relative address but far fewer records than could be separately addressed with a 23 bit address will typically be stored in a context file, the index is set to a value that equals the value of the pointer modulo the maximum number of records that will actually be stored in the file. For example, if the pointer indicates that record $730_7$ is the next available record in file 740, then once the call processor, that is associated with this file, begins processing the next transaction and produces context information, this information will be stored within record $730_7$. In addition, the relative address associated with this transaction, i.e. the value "7", will be placed within the "tid" bits for the appropriate transaction identifier (originating or responding) for this transaction. Now, whenever the value of this pointer reaches a value that equals the maximum number of records to be stored in the context file, the value of the pointer is merely allowed to overflow which, in turn, causes the value of the index, as symbolized by line 745, to point to the location of the first record, i.e. record $730_0$, in the file. Inasmuch as the size of the file is set to a value that is sufficiently large, as discussed above, to accommodate all call (transactional) processing that is expected to occur under worst case conditions within a given time period (five minutes as noted above), then, once the context file is full, the incrementing pointer allows the latest transaction record to merely over-write the oldest transaction record in the file.

By incorporating such a transaction identifier into a conversational message coupled with use of relative addressed context files, any conversational message can be associated with its corresponding context information by any BE processor, thereby allowing conversational transactions to be readily processed in an SCP regardless of SS7 packet distribution. This is clearly evident in FIGS. 8A and 8B, for which the correct alignment of the drawing sheets for these figures is shown in FIG. 8, which collectively depict an illustrative message flow that could occur within SCP 200 whenever my inventive method is used in processing the illustrative conversational transaction depicted in FIG. 4 for PVN service. To fully appreciate this message flow, the reader should simultaneously refer to FIGS. 4, 8A and 8B.

As shown, an incoming packet, denoted by the circled letter "A", from STP 56 contains, for example, a query for PVN service. First, this packet is routed over active link $83_1$, as represented by line 501, to FE processor $210_1$ located within SCP 200. This FE processor through SS7 Protocol Processing operation 512 processes layers 1, 2 and 3 of this SS7 packet and sends the TCAP query message, represented by "(A)", contained in this packet to BE processor $220_1$, as symbolized by line 503.

Thereafter, TCAP Processes 551 executing within BE processor $220_1$ parses the query from the TCAP message and then routes the query using its internal address to an input queue (not shown) within the PVN call processor executing within this BE processor, e.g. call processor $221_2$. This call processor as well as all others, i.e. call processors $221_1$, $221_3$, ..., $221_m$, that execute on BE processor $220_1$ utilize transaction database access routines $227_1$. Identical routines to those that form transaction database access routine $227_1$ form transaction database access routines $227_2$, $227_3$, ..., $227n$ located in BE processors $220_2$, $220_3$, ..., $220_n$, respectively. Through routines $227_1$, call processor $221_2$ first creates a record at illustratively an address "Z" as discussed below, within PVN context file $575_2$ that is associated with this call processor to store context information regarding the current PVN transaction that is being processed. Specifically, certain routines located within routines $227_1$, which are described in detail later in conjunction with FIGS. 9-14, permit any call processor executing on this BE processor to, inter alia: create a record within a context file for a corresponding call processor executing on this BE processor and, whenever necessary, access any record stored on a context file associated with any call processor executing on any BE processor. Access occurs by using the specific values of a responding transaction identifier embedded within the transaction ID field of the transaction portion of a TCAP conversational message, as described above, as a relative address to an appropriate location in the desired context file. Disk drives 262 store transaction databases 570 for BE processors 220 and specifically transaction database sets $570_1$, $570_2$, $570_3$, ..., $570_n$ for BE processors $220_1$, $220_2$, $220_3$, ..., $220n$, respectively. Each of these transaction database sets associated with a specific BE processor contains a separate context file for records created by each call processor executing thereon. Specifically, context files 575 residing within transaction database set $570_1$ are collectively formed of individual context files $575_1$, $575_2$, ..., $575_m$ that contain records created by call processors $221_1$, $221_2$, ..., $221_m$, respectively. As part of each transaction database set, disk drives 262 also store databases 579, such as customer records and other remaining files, which are needed in processing calls that require remote database translation and appropriately accessed by the call processors executing on the back end processors. Other routines (not shown) located within transaction database access routines $227_1$ provide access to databases 579.

Transaction database access routines $227_2$, $227_3$, ..., $227_n$, execute on corresponding BE processors $220_2$, $220_3$, ... $220_n$, to enable any of these BE processors to access any record stored within any of the context files located within transaction databases 570 and associated with any of the BE processors, Diagrammatically, this access between BE processor $220_1$ and the context files stored in any one of transaction databases 570 is simplistically shown by access paths 543 that contain individual access paths $543_1$, $543_2$, $543_3$, ..., $543_n$. Similar access between BE processor $220_2$ and the context files stored in any one of transaction databases 570 is simplistically shown by access paths 545 that contain individual access paths $545_1$, $545_2$, $545_3$, ..., $545_n$. Likewise, access paths 547 and 549 which respectively contain individual access paths $547_1$, $547_2$, $547_3$, ..., $547_n$ and $549_1$, $549_2$, $549_3$, ..., $549_n$ connect BE processors $220_3$ and $220_n$ with the context files in any one of transaction databases 570. Similar access paths would exist between any BE processors intervening between BE processors $570_3$ and $570_n$ and all the individual transaction databases within transaction databases 570. In reality, each of these access paths would be implemented, as shown in FIGS. 2A and 2B, by a path through dual path computer interconnect busses, star coupler 230, a disk controller and either bus $252_1$ or bus $252_2$ and be controlled by appropriate disk access and control software.

Now, for the incoming PVN query, call processor $221_2$ accesses the appropriate customer record stored within databases 579, via access path 543, and specifically as symbolized by line 619, to determine whether any additional information must be obtained from the caller in order to process the transaction. If this access specifies that additional information, here digits for a PIN and an authorization code, is needed, an op-code, that specifies the next piece of information, digits for the PIN and authorization code, that needs to be obtained from the caller is sent back to the call processor, as symbolized by lines 613 and 616. Thereafter, call processor $221_2$ invokes an appropriate routine within transaction database access routines $227_1$, specifically ADD routine 1300 discussed in detail below in conjunction with FIG. 13, to determine the address of the next record in the PVN context file, i.e. context file $575_2$, for call processor $221_2$ and then add a new record to this context file. This operation is symbolized by lines 613 and 622. The new record stores the context of the PVN call processing associated with this query. Call processor $221_2$ then formulates a conversational message. This message contains the op code in order to instruct SSP 30 to obtain the necessary information. In addition, this message also contains a specific value for the originating transaction identifier. This value (illustratively value "Z" as the originating transaction identifier shown in FIG. 4) is obtained from the ADD routine and identifies context file $575_2$ and also provides the relative address of the particular record within that file at which the context information for this transaction is being stored. The value of the originating transaction identifier that existed within the TCAP query message (value "X" as shown in FIG. 4) initially generated by SSP 30 is copied into the responding transaction identifier. Consequently, a resulting conversational message containing this op code and these originating and responding transaction identifiers is routed by call processor $221_2$ through an appropriate output queue (not shown) to TCAP Processes 551 to fabricate an appropriate TCAP conversational message. Thereafter, this TCAP conversational message, represented by "(B)", is routed, as symbolized by line 509, over link $216_1$ to FE processor $210_1$. Here, SS7 protocol processing operation 512 fabricates a SS7 packet that contains this TCAP conversational message, and then transmits this packet represented by the circled letter "B", over active link $83_1$, as symbolized by line 511, to STP 56 for eventual routing through CCS network 50 to SSP 30. Since all the call processors executing in the SCP utilize input and output queues for temporary message buffering, then to simplify the discussion, these queues will not be discussed any further.

Now, once SSP 30 issues a packet, represented by the circled letter "C", containing digits for the PIN and authorization code that were entered by the caller, this packet, as a result of SS7 packet distribution, will likely be routed to a different active link than link $83_1$ in link set 83 shown in FIGS. 8A and 8B. Assume, for purposes of the present discussion, that the active link that is used is illustratively link $83_3$. As such, the incoming SS7 packet is routed over this link, as symbolized by line 521, to FE processor $210_3$. This FE processor, similar to FE processor $210_1$ that has been discussed above, processes layers 1, 2 and 3 of this incoming SS7 packet and sends the TCAP conversational message, represented by "(C)", contained in this packet to BE processor $220_3$, as symbolized by line 523. TCAP Processes 553 executing within BE processor $220_3$ parse the conversational message from the TCAP message and then route the conversational message using its internal address to the PVN call processor executing within this BE processor, e.g. call processor $223_2$. This call processor examines the responding transaction identifier field contained within the TCAP message. Inasmuch as this field contains an address "Z" which points to a specific record within context file $575_2$ located within transaction databases $570_1$, this call processor accesses this record, via access path $547_1$ and using routines $227_3$, to obtain the current contextual information regarding the current state of transaction processing for this call for PVN service. This access operation is symbolized by lines 633 and 636. Once this context information is provided to call processor $223_2$, this call processor using routines $227_3$ accesses, as symbolized by lines 633 and 639, the appropriate customer record residing within databases 579 with the entered digits for the PIN and authorization code and then appropriately updates the context information for this transaction, also symbolized by lines 633 and 636. As a result of this access, the customer record may specify an additional piece of information that needs to be obtained from the caller. An op code representing this information is supplied, as symbolized by lines 633 and 642, by the customer record back, via access routines $227_3$, to call processor $223_2$. The call processor assembles a conversational message that contains this op code. In addition, this message contains the value "Z" as the originating transaction identifier, to specifically point to the record stored within context file $575_2$ at which contextual information for the current transaction being processed is stored, and the value "X" as the responding transaction identifier in order to enable SSP 30 to associate this conversational message with a specific transaction it is processing. Thereafter, call processor $223_2$ routes this conversational message to TCAP Processes 553 to fabricate an appropriate TCAP conversational message. Thereafter, this TCAP conversational message, represented by "(D)", is routed, as symbolized by line 536, over link $216_3$ to FE processor $210_3$. Through SS7 protocol processing, this FE processor fabricates a SS7 packet that contains this TCAP conversational message, and then transmits this packet represented by the circled letter "D", over active link $83_3$, as symbolized by line 538, to STP 56 for eventual routing through CCS network 50 to SSP 30.

For each subsequent TCAP conversational message that forms part of the current transaction and has been generated by SSP 30 and routed as a packet through STP 56 to any FE processor within SCP 200, the corresponding BE processor utilizes the value of the responding transaction identifier in that message to access a specific record stored within context file $575_2$ to obtain the current state of transaction processing for this call. With the context information, this corresponding BE processor then uses databases 579 within transaction databases $570_1$ in incrementally advancing the transactional processing given the information supplied by SSP 30. Once this occurs, the corresponding BE processor updates the context information stored in this specific record to reflect an additional piece of information supplied by SSP 30 and hence a subsequent change in the state of transaction processing for this call.

Eventually, SSP 30 will generate a packet, represented by the circled letter "P", that will contain the last TCAP conversational message in the current transaction. As a result of packet distribution inherent in the SS7 protocol, STP 56 may route this packet over active link $83_n$ located within link set 83 to SCP 200. As such, this packet will be routed, as symbolized by line 581, to FE processor $210_n$. This FE processor, similar to FE processors $210_1$ and $210_3$ that have been discussed above, processes layers 1, 2 and 3 of this SS7 packet and sends the TCAP conversational message, represented by "(P)", contained in this packet to BE processor $220_n$, as symbolized by line 583. Thereafter, TCAP Processes 555 executing within BE processor $220_n$ parse the conversational message from the TCAP message and then route the conversational message using its internal address to the PVN call processor executing within this BE processor, e.g. call processor $229_2$. This call processor examines the responding transaction identifier field contained within the TCAP message. Inasmuch as this field contains the address "Z" which points to a specific record within context file $575_2$ located within transaction databases $570_1$, this call processor, using routines $227_n$, accesses this record, over access path $549_1$, to obtain the current context information for this call. This access operation is symbolized by lines 653 and 656. Once this context information is provided to call processor $229_2$, this call processor, through use of access routines $227_n$, accesses, as symbolized by lines 653 and 659, the appropriate customer record residing within databases 579 with the latest item of information, represented by "(P)", that has been provided by the caller through SSP 30. Inasmuch as all the necessary information has been entered as specified by the customer record, the customer record now provides, via access routines $227_n$, a response containing appropriate call routing information (a destination routing number and carrier identification) represented by "(Q)" to the query. At this point all that remains to conclude transactional processing is to form a SS7 packet containing this response and transmit it back to SSP 30. The specific record for this transaction stored within context file $575_2$ can be updated, if desired, by BE processor $227_n$ to indicate that this transaction has been concluded. Alternatively, since each context file uses a circular file structure, as discussed above, the record for this transaction need not be updated. In this case, this record will subsequently be ignored until it expires at which point it will simply be over-written by context information for a subsequently occurring transaction. In any event, to furnish a SS7 response packet to SSP 30, the call routing information furnished by databases 579, represented by lines 653 and 662, is assembled into a response message by call processor $229_2$. Thereafter, this response message is fabricated into an appropriate TCAP response message by TCAP Processes 555. Thereafter, this TCAP response message, represented by "(Q)", is routed, as symbolized by line 589, over link $216_n$ to FE processor $210_1$. Through SS7 protocol processing, this FE processor fabricates a SS7 packet that contains this TCAP response message, and then transmits this packet, represented by the circled letter "Q", over active link $83_n$, as symbolized by line 591, to STP 56 for eventual routing through CCS network 50 to SSP 30. Since transmission of this SS7 packet by SCP 200 concludes the processing of this transaction, the TCAP response message generated by BE processor $220_n$ only contains the value "X" as the responding transaction identifier in order to enable SSP 30 to associate this packet with a specific transaction it is processing. As discussed above, the TCAP response message contained in this packet has no originating transaction identifier.

Now, having discussed the use of specialized transaction identifiers and relative addressed context files, the discussion will conclude with an examination of the various software routines that are used in implementing the inventive method. As noted above, these routines form part of transaction database access routines, such as access routines $227_1$ in BE processor 2201, that execute on every BE processor. These software routines include: CREATE Routine 900, LOCATE Routine 1000, OPEN Routine 1100, CLOSE Routine 1200, ADD Routine 1300 and GET Routine 1400.

FIG. 9 shows a flowchart of CREATE Routine 900. This routine, when executed, creates and initializes the context file for the specific call processor (e.g. call processor j) that called this routine. This routine is executed whenever that call processor is brought on-line.

Specifically, upon entry into routine 900, execution first proceeds to block 910. This block, when executed, initializes a file access block and record access block for call processor j. The file and record access blocks are control blocks (effectively buffers) used by the operating system executing in a BE processor to store attribute information regarding the file and the record, respectively, that will be subsequently created. Thereafter, execution proceeds to block 920 which creates a file by making an entry in an appropriate directory and then assigns this file as a context file for call processor j. Block 930 is then executed to close this file. Thereafter, execution proceeds to block 940, which, when executed, returns a message indicating that the context file creation process has been successfully completed. Once this occurs, execution exits from routine 900 and returns to a call processor.

FIG. 10 shows a flowchart of LOCATE Routine 1000. This routine, when executed, searches through the context file associated with the specific call processor that called this routine in order to determine the most recent value of the transaction identifier currently in use in this context file.

Specifically, upon entry in routine 1000, execution proceeds to block 1010 which opens the context file associated with call processor j. Once this occurs, execution proceeds to block 1020. This block, when executed, searches through all the individual records within this context file to locate that record having a latest time stamp. Since each record carries a time stamp entry of when it was created, the latest time stamp specifies the most recently created record and hence, by use of relative addressing inherent in the context file, the most recent transaction identifier then in use. Once this record is located, execution proceeds to block 1030. This block, when executed, returns the value of the transaction identifier for the context file for call processor j by placing this value in an appropriate table. Thereafter, block 1040 executes to close the context file associated with call processor j. Thereafter, execution proceeds to block 1050 which, when executed, returns a message indicating that this routine has successfully executed. Once this occurs, execution exits from routine 1000 and returns to a call processor.

Figure 11B:
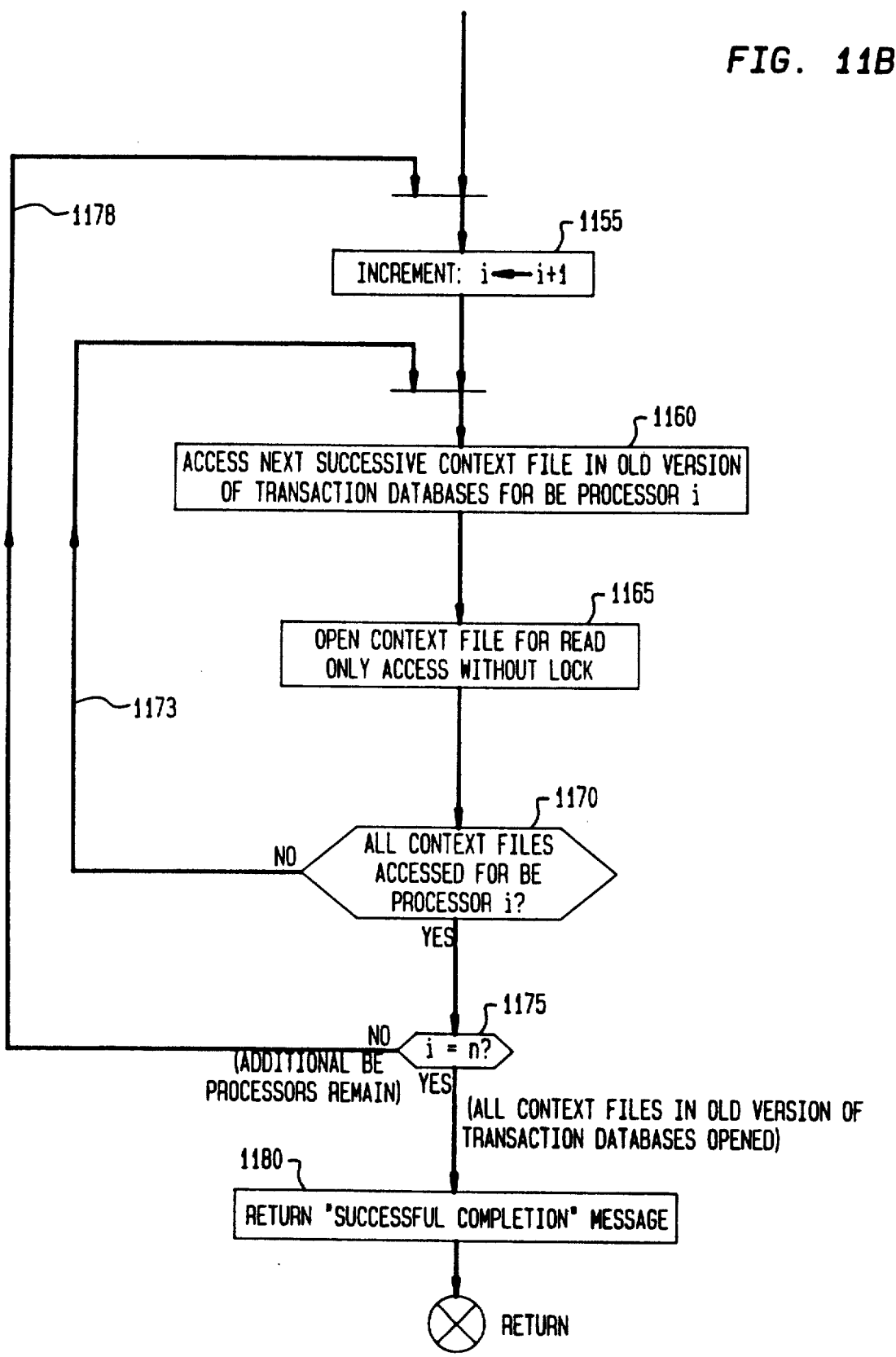

A flowchart of OPEN Routine 1100 is collectively shown in FIGS. 11A and 11B, for which the correct alignment of the drawing sheets for these figures is depicted in FIG. 11. This routine, when executed, opens either an old or new version of all the context files in the transaction databases for all back end processors in the SCP. This routine is executed whenever SCP application software is to be brought up on all BE processors, such as after a power up condition, or to begin use of a specific version of the context files on the SCP.

Specifically, upon entry into routine 1100, execution proceeds to block 1105 which, when executed, initializes the contents of loop counter i to zero. During subsequent execution of this routine, counter i will point to a specific BE processor for which context files are being opened. Thereafter, decision block 1110 is executed. This block, when executed, tests the value of a user specified parameter to determine whether a new version of the transaction databases for all the BE processors is to be opened. In the event the new version is to be opened, then decision block 1110 routes execution, via its YES path, to block 1115. This latter block, when executed, increments the contents of counter i by one. Execution then passes to block 1120 which accesses the next successive context file in the new version of transaction database set for BE processor i (first context file in this set if this routine has just started executing). Thereafter, execution proceeds to decision block 1125 This block determines whether this next successive context file is associated with a call processor that is currently executing on the back end processor i. If this file is so associated, then decision block 1125 routes execution, via its YES path, to block 1130. This latter block, when executed, opens this context file for read/write access with a create option selected and without a lock option selected. By selecting the create option, this call processor is informed by the operating system that this processor has the power to subsequently create the file if the file is not yet in existence. Through use of this option, a call processor will only create its associated context file and will not create a context file for a different call processor. Alternatively, in the event that the file is not associated with a call processor that is currently executing on the specified back end processor, then decision block 1125 routes execution, via its NO path, to block 1135. This latter block, when executed, merely opens this context file for read only access without a lock option selected. Here, the create option is not selected inasmuch as this context file is not associated with any call processor currently executing on the BE processor i. After either block 1130 or block 1135 has executed, execution proceeds to decision block 1140 to determine if all the context files associated with the BE processor i have been accessed. If any such files remain to be accessed, i.e. specifically opened, then execution proceeds from decision block 1140, via NO path 1143, to block 1120 in order to access the next successive one of these files and so on. Alternatively, if all the context files have been accessed, then decision block 1140 routes execution, via its YES path, to decision block 1145. This latter decision block determines whether the transaction databases for all the BE processors in the SCP have been accessed, i.e. whether the contents of counter i equals the value "n" (the number, which has been supplied to the routine as a calling parameter, of separate back end processors situated within an SCP). In the event remaining BE processors with unaccessed transaction databases exist, i.e. the contents of counter i are less than the value "n", then decision block 1145 routes execution, via NO path 1148, back to block 1115 to access the transaction databases for the next successive BE processor and so on. However, if the transaction databases for all the BE processors in the SCP have been accessed, then decision block 1145 routes execution, via its YES path, to block 1150. This latter block, when executed, returns a message indicating that this routine has successfully executed. Once this occurs, execution exits from routine 1100 and returns to a call processor that called this routine.

Now, if the old version of the transaction databases for all the call processors on the specified BE processor is to be opened, then decision block 1110 routes execution, via NO path 1113, to block 1155. This latter block, when executed, increments the contents of counter i by one. Thereafter, execution proceeds to block 1160. This block, when executed, accesses the next successive context file in the old version of the transaction database set for the BE processor i (first context file in this set if this routine has just started executing). Once this occurs, execution proceeds to block 1165. This block, when executed, merely opens this context file for read only access without a lock option selected. Thereafter, execution proceeds to decision block 1170 to determine if all the context files associated with the BE processor i have been accessed. If any such files remain to be accessed, i.e. specifically opened, then execution proceeds from decision block 1170, via NO path 1173, to block 1160 in order to access the next successive one of these files and so on. Alternatively, if all the context files for BE processor i have been accessed, then decision block 1170 routes execution, via its YES path, to decision block 1175. This latter decision block determines whether the transaction databases for all the BE processors in the SCP have been accessed, i.e. whether the contents of counter i equals the value "n". In the event remaining BE processors with unaccessed transaction databases exist, i.e. the contents of counter i are less than the value "n", then decision block 1175 routes execution, via NO path 1178, back to block 1155 to access the transaction databases for the next successive BE processor and so on. However, if the transaction databases for all the BE processors in the SCP have been accessed, then decision block 1175 routes execution, via its YES path, to block 1180. This latter block, when executed, returns a message indicating that this routine has successfully executed. Once this occurs, execution exits from routine 1100 and returns to a call processor that called this routine.

FIG. 12 shows a flowchart of CLOSE Routine 1200. This routine, when executed, closes either an old or new version of all the context files in the transaction database set for every back end processor in the SCP. This routine is executed whenever SCP application software is to be brought down, such as before a power off condition, or to completely cease use of a specific version of the context files.

Specifically, upon entry into routine 1200, execution proceeds to decision block 1210. This block, based upon the value of a calling parameter, determines whether the new version of the context files in the transaction database set for every specific back end processor is to be closed. In the event the new version is to be closed, then decision block 1210 routes execution, via its YES path, to block 1230. This latter block, when executed, successively closes each new version of the context files in the transaction database set for every back end processor. Alternatively, if the old version of the context files in the transaction database set is to be closed, then decision block 1210 routes execution, via its NO path, to execution block 1220. This block, when executed, successively closes each old version of the context files in the transaction database set for every back end processor. Thereafter, once block 1220 or 1230 fully executes, execution proceeds to block 1240. Block 1240, when executed, merely returns a message indicating that this routine has successfully executed. Once this occurs, execution exits from routine 1200 and returns to a call processor.

Figure 13:
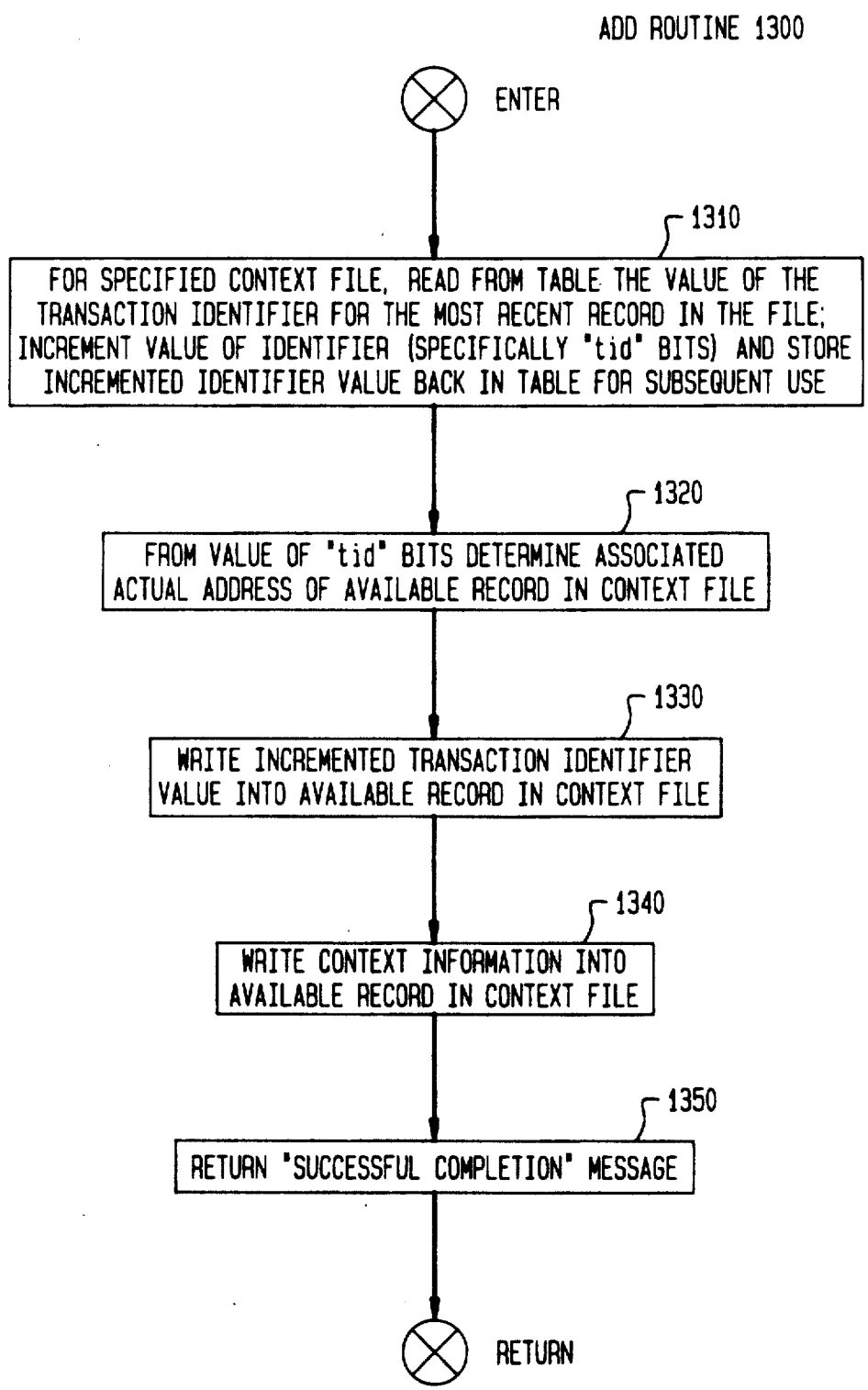
FIG. 13 shows a flowchart of ADD Routine 1300.

FIG. 13 shows a flowchart of ADD Routine 1300. This routine, when executed, inserts a new record into a specific context file. As such, this routine is invoked by a call processor only at the beginning of conversational transaction processing for the current transaction.

Specifically, upon entry into routine 1300, execution proceeds to block 1310 which for a specific context file, designated by the values of appropriate calling parameters that identify a specific call processor and a specific back end processor, reads the value of the transaction identifier associated with the most recent record from the table used by the LOCATE routine. This block then increments this value (specifically by incrementing the value of the "tid" bits by one) and stores the new transaction identifier value back into the table. Thereafter, execution proceeds to block 1320. This block, when executed, determines the actual address of the next available record in the context file from the incremented value of the "tid" bits. Once this has occurred, execution proceeds to block 1330 which, when executed, writes the incremented transaction identifier value into this record in the context file. Thereafter, block 1340 is executed to write initial context information regarding the current transaction into this record. After this occurs, block 1350 executes to merely return a message indicating that this execution of routine 1300 has been successfully completed. Thereafter, execution exits from routine 1300 and returns to a call processor.

Figure 14:
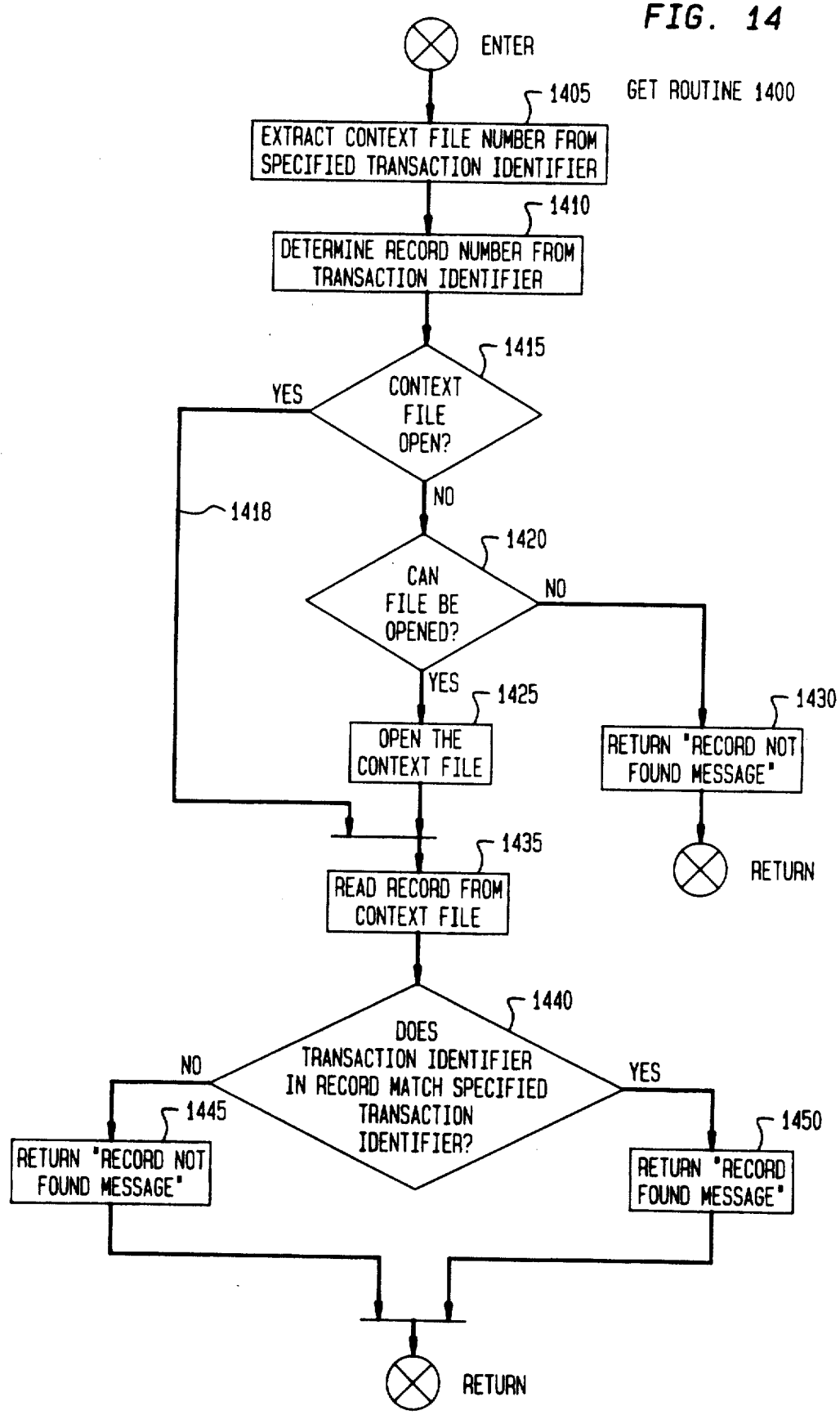
FIG. 14 shows a flowchart of GET Routine 1400.

FIG. 14 shows a flowchart of GET Routine 1400. In essence, this routine, when executed, searches a specific context file for a requested record and then, once the record is found, reads the record from the file.

Specifically, upon entry into routine 1400, execution first proceeds to block 1405. This block, when executed, extracts a file number of the desired context file from the transaction identifier that has been specified as a calling parameter to the routine. Thereafter, block 1410 is executed to determine the record number from the transaction identifier. Once this occurs, execution proceeds to decision block 1415 to determine if the desired context file is open. If this file has not been opened, then decision block 1415 routes execution, via its NO path, to decision block 1420. This latter decision block determines whether this file can be opened at all. If the operating system executing in the back end processor specifies that this file can not be opened, e.g. because it does not exist, then decision block 1420 routes execution, via its NO path, to block 1430. This block returns an appropriate error message specifying that the desired record can not be found. Thereafter, execution exits from routine 1400 and returns to a call processor. Alternatively, if the desired context file can be opened, then decision block 1420 routes execution to block 1425 which, when executed, opens this context file.

Now, if this context file has already been opened, execution proceeds, via YES path 1418, to block 1435. Alternatively, execution reaches block 1435 after block 1425 has executed to open this file. In either case, block 1435 reads the desired record from the context file. Now, once this occurs, the value of the transaction identifier stored within the record is compared against the value of the transaction identifier used to access this record to determine if the proper record has been accessed. Specifically, once the record has been read, execution proceeds to decision block 1440. This decision block compares the value of the transaction identifier stored within the record to the value of the transaction identifier used to access this record. In the event a match occurs, which is the normal condition, then execution proceeds from decision block 1440, via its YES path, to block 1450. This latter block, when executed, returns an appropriate message indicating that the desired record has been found. Alternatively, if a match does not occur, i.e. indicative of an error condition, then execution proceeds from decision block 1440, via its NO path, to block 1445. This latter block, when executed, returns an appropriate message indicating that the desired record has not been found. Once either block 1445 or 1450 executes, then execution exits from routine 1400 and returns to a call processor. This now concludes the discussion of the specific software routines used in implementing the inventive method.

Use of the inventive method advantageously injects a degree of fault tolerance into a distributed processing system. Specifically, if a processor which is situated in a distributed processing system and which provides transactional processing fails, then the remaining transactions can be routed to any or all remaining active processors in this system which, by use of the transaction identifier and accessibility into the files associated with the failed processor, can continue to provide transactional processing with the only noticeable effect of consequence being a possibly degraded throughput in the system.

Now, with the above description in mind, those skilled in the art will clearly recognize that the inventive method can be used to facilitate conversational transaction processing in substantially any distributed processing system that has a shared file system residing on a shared memory device, a mechanism, such as but not limited to a particular protocol, that distributes packets (or messages) among individual processors in the system and permits application specific identifiers to be embedded in the distributed packets (or messages). These processors can but need not be arranged in a replicated FE-BE architecture. Nearly any architecture can be used as long as all the processors have access to a shared file system and can communicate packets (or messages) containing application specific identifiers directly or indirectly with any other processor in the architecture. For example, the inventive method can be used in a distributed processing system where incoming packets that appear on one or more wideband links from a network are distributed to individual processors by a single front end communications processor that is connected to the link(s).

Specifically, the inventive method is not limited to use in an SCP, but can also be used in an SSP or in substantially any other distributed call processing system. Furthermore, although the inventive method has been described in the context of use in a SS7 protocol environment, this method can be used in conjunction with substantially any layered communication protocol, such as but not limited to the X.25 protocol, that relies on packet distribution among active links in a link set and provides application specific fields for identification, specifically transaction identification, purposes.

Although the distributed processing system has been described as one that requires a caller to interactively enter each item of information defined by a customer record, this information can alternatively be provided through a computer or other system that has the capability to store this information and later retrieve each item of information upon request from an SSP. For example, either a local switch or more likely an adjunct to the switch could itself be programmed to provide this capability thereby relieving the caller of the tedium of remembering and subsequently keying in the information defined by the customer record each time he or she makes a call for an enhanced network service.

In general, by incorporating application specific (e.g. transaction) identification numbers, that designate the location of an associated record containing context information situated within a shared file system situated on a shared disk farm in a processing node, into individual packets that are transported from one processing node to another in a distributed processing system, substantially any distributed processor that can connect, either directly or indirectly (i.e. through another processor), to the shared disk farm can provide incremental transaction processing of any conversation that forms part of a transaction. In this manner, a transaction can be sequentially processed by a number of different processors whenever the need to do so arises. Although the BE processors used in the illustrative replicated FE-BE architecture discussed above that provides transactional processing in an SCP are all located within a single system in one geographic location and connected to a shared disk farm also co-located thereat, the transactional processors that can utilize the inventive method can be geographically dispersed as long as they all have direct or indirect access to files residing within the shared disk farm regardless of where that disk farm is actually located. The processors can either be part of a distinct processing cluster where only those processors in the cluster have access to a shared disk farm or can be geographically dispersed with all processors in the system having remote access to a shared disk farm. Moreover, substantially any shared memory device, such as but not limited to a multi-ported semiconductor memory, that can be accessed by several processors and provides an adequate storage capacity for the databases that will be used by the individual applications executing on the individual processors and a sufficiently small access time can be substituted for the shared disk farm. The specific type of the memory will of course be governed by various desired characteristics of the distributed processing system. Clearly, then, the inventive method can find use in implementing conversational transaction processing in a variety of distributed processing systems having widely varying architectures.

Although a single embodiment which incorporates the teachings of the present invention has been shown and described herein, those skilled in the art can readily devise many other varied embodiments that incorporate these teachings.

I claim:

1. In a distributed processing system having at least an originating and a responding node connected through a communication path wherein the responding node comprises a plurality of processors and a memory device, wherein each of said processors has a corresponding database associated therewith and residing within said memory device, a method for use in processing successive portions of a conversational transaction using different ones of said processors comprising the steps of:

in a first one of the processors in said responding node:

processing a first portion of a conversational transaction as specified by a first record, wherein the first record defines a manner in which the conversational transaction is to be completely processed and is located within a first database residing within the memory device and associated with the first processor;

storing context information for the conversational transaction as a second record at a pre-defined address in the first database, wherein the context information defines a current state of the conversational transaction; and producing a first message, as part of the conversational transaction for transmission from said responding node over said communication path to said originating node wherein the first message contains a request for application information from the originating node, and a first transaction identifier field having a value that corresponds to said pre-defined address, said application information being defined by the first record and required for processing a second portion of the conversational transaction subsequent to said first portion;

in said originating node;

generating a second message, as part of said conversational transaction and in response to said first message, for transmission over said communication path to said responding node, wherein said second message contains the application information, furnished in response to said request, and a second transaction identifier field having the same value as the first transaction identifier field; and in a second one of said processors in said responding node and different from the first one of said processors:

receiving said second message;

generating the pre-defined address from the value of the second transaction identifier field contained in the second message;

accessing, in response to said pre-defined address generating step, the context information from said first database; and processing the second portion of the conversational transaction using the application information contained in said second message and commencing at a point in the first record defined by the context information.

2. The method of claim 1 wherein, in said first one of the processors, said producing step comprises the step of inserting an instruction field into said first message wherein said instruction field specifies a pre-defined item of the application information, said item being defined by said first record and required by said responding node to process the second portion of the conversational transaction;

and wherein, in said originating node, the second message generating step comprises the step of inserting a protocol field into the second message wherein said protocol field contains the item of application information.

3. The method in claim 2 further comprising, in said second one of the processors, the step of updating the context information stored in said second record to reflect the current state of the conversational transaction.

4. The method of claim 3 wherein the first record is a customer record and, in the first one of the processors, the first message producing step comprises the step of preforming a database look up operation into the customer record to determine the pre-defined item of information required to process the second portion of the conversational transaction.

5. The method in claim 4 further comprising, in the first one of the processors, the steps of:

receiving a request from said originating node to process a conversational transaction; and performing said first portion processing step in response to said request.

6. The method of claim 4 further comprising, in said first one of the processors, the step of forming said first transaction identifier to contain a plurality of separate fields wherein first, second and third ones of said separate fields contain corresponding numbers that respectively identify a specific one of the processors, a specific software process executing on the specific processor and a relative address pointing to a desired one of a plurality of second records residing within a context file situated in said first database.

7. The method in claim 4 wherein said communication path comprises a signalling network having an internal node and being interconnected between said originating and responding nodes wherein each of the processors in the responding node is connected through a separate corresponding front end processor located in said responding node to a physical link in a link set that connects the responding node to the internal node and said method further comprises the step of distributing messages being transmitted from said internal node to said responding node on a substantially equal basis over individual physical links then active in the link set.

8. The method in claim 7 in which the originating node is a service switching point, the responding node is a service control point and the internal node is a signal transfer point.

9. The method in claim 4 wherein said first database comprises a context file formed of a plurality of second records and further comprises, in said first one of the processors, the steps of:
storing a relative address to a first one of the second records in the context file as an index value, said second records forming the context file within said first database; and
incrementing the index value after each successive one of the second records has been established in the context file.

10. The method of claim 9 further comprising the step of permitting the index value to roll over to a relative address associated with the first one of the second records in the context file after said index has been incremented past a relative address associated with a last one of the second records in the context file.

11. The method in claim 10 wherein said first message producing step comprises the step of forming said first transaction identifier to contain a plurality of separate fields wherein first, second and third ones of said separate fields contain corresponding numbers that respectively identify a specific one of the processors, a specific software process executing on the specific processor and a relative address pointing to a desired one of the plurality of second records residing within the context file situated in said first database.

12. In a distributed processing system having at least an originating and a responding node connected through a communicating path wherein the responding node comprises a plurality of processors and a memory device, wherein each of said processors has a corresponding database associated therewith and residing within said memory device, a method for use in processing successive portions of a conversational transaction using different ones of said processors comprising the steps of:
in said originating node:
generating, in response to an incoming request for a specific service, a corresponding request to begin a conversational transaction;
transmitting the corresponding request over said communication path to said responding node;
in a first one of the processors in said responding node:
receiving said corresponding request;
processing, in response to said corresponding request, a first portion of a conversational transaction as specified by a first record, wherein the first record defines a manner in which the conversational transaction is to be completely processed and is located within a first database residing within the memory device and associated with the first processor;
creating a second record at a pre-defined address in the first database;
storing context information for the conversational transaction within the second record, wherein the context information defines a current state of the conversational transaction;
producing a first message, as part of the conversational transaction for transmission from said responding node over said communication path to said originating node wherein the first message contains a request for application information from the originating node, and a first transaction identifier field having a value that corresponds to said pre-defined address, said application information being defined by the first record and required for processing a second portion of the conversational transaction subsequent to said first portion; and
transmitting said first message to said originating node;
in said originating node:
receiving said first message; and
generating a second message, as part of said conversational transaction and in response to said first message, for transmission over said communication path to said responding node, wherein said second message contains the application information, furnished in response to said request, and a second transaction identifier field having the same value as the first transaction identifier field; and
in a second one of said processors in said responding node and different from the first one of said processors:
receiving said second message;
generating the pre-defined address from the value of the second transaction identifier field contained in the second message;
accessing, in response to said pre-defined address generating step, the context information from said first database;
processing the second portion of the conversational transaction using the application information contained in said second message and commencing at a point in the first record defined by the context information so as to provide a response message; and
transmitting said response message to said originating node to conclude the conversational transaction such that the originating node is able to provide the specific service.

13. The method of claim 12 further comprising, in said second one of the processors, the step of updating the context information stored in said second record to reflect the current state of the conversational transaction.

14. The method of claim 13 wherein the first record is a customer record and, in the first one of the processors, the first message producing step comprises the step of preforming a database look up operation into the customer record to determine the pre-defined item of information required to process the second portion of the conversational transaction.

15. The method of claim 14 wherein said communication path comprises a signalling network having an internal node and being interconnected between said originating and responding nodes wherein each of the processors in the responding node is connected through a separate corresponding front end processor located in said responding node to a physical link in a link set that connects the responding node to the internal node and said method further comprises the step of distributing messages being transmitted from said internal node to said responding node on a substantially equal basis over individual physical links then active in the link set.

16. The method of claim 14 wherein said first database comprises a context file formed of a plurality of second records and further comprises, in said first one of the processors, the steps of:
  storing a relative address to a first one of the second records in the context file as an index value, said second records forming the context file within said first database; and
  incrementing the index value after each successive one of the second records has been established in the context file.

17. The method of claim 16 wherein said first message producing step comprises the step of forming said first transaction identifier to contain a plurality of separate fields wherein first, second and third ones of said separate fields contain corresponding numbers that respectively identify a specific one of the processors, a specific software process executing on the specific processor and a relative address pointing to a desired one of the plurality of second records residing within the context file situated in said first database.

18. In a system for processing calls for network services, said system having a service switching point (SSP) and a service control point (SCP) connected through a signalling network containing a signal transfer point (STP) and wherein the SCP comprises a plurality of processors and a memory device, wherein each of the processors has a corresponding database associated therewith and residing within said memory device, a method for use in processing successive portions of a conversational transaction using different ones of said processors comprising the steps of:
  in the SSP:
    generating a query message to begin a conversational transaction in response to an incoming call for a desired network service; and
    transmitting the query message over said network to the SCP;
  in a first one of the processors in the SCP:
    receiving said query message;
    processing, in response to said query message, a first portion of a conversational transaction as specified by a first record, wherein the first record defines a manner in which the conversational transaction is to be completely processed and is located within a first database residing within the memory device and associated with the first processor;
    creating a second record at a pre-defined address in the first database;
    storing context information for the conversational transaction within the second record, wherein the context information defines a current state of the conversational transaction;
    producing a first message, as part of the conversational transaction for transmission from said SCP over said communication path to said SSP wherein the first message contains a request for application information from the SSP, and a first transaction identifier field having a value that corresponds to said pre-defined address, said application information being defined by the first record and required for processing a second portion of the conversational transaction subsequent to said first portion; and
    transmitting said first message to the SSP; in the SSP:
    receiving said first message; and
    generating a second message, as part of said conversational transaction and in response to said first message, for transmission over said network to said SCP, wherein said second message contains the application information, furnished in response to said request, and a second transaction identifier field having the same value as the first transaction identifier field; and
  in a second one of said processors in the SCP and different from the first one of said processors:
    receiving said second message;
    generating the pre-defined address from the value of the second transaction identifier field contained in the second message;
    accessing. in response to said pre-defined address generating step, the context information from said first database;
    processing the second portion of the conversational transaction using the application information contained in said second message and commencing at a point in the first record defined by the context information so as to provide a response message; and
    transmitting said response message to said SSP to conclude the conversational transaction such that the SSP is able to provide the desired network service.

19. The method of claim 18 wherein the first record is a customer record and, in the first one of the processors, the first message producing step comprises the step of preforming a database look up operation into the customer record to determine the pre-defined item of information required to process the second portion of the conversational transaction.

20. The method of claim 19 wherein each of the processors in the SCP is connected through a separate corresponding front end processor located in the SCP to a physical link in a link set that connects the SCP to the STP and said method further comprises the step of distributing messages being transmitted from the STP to said SCP on a substantially equal basis over individual physical links then active in the link set.

21. The method of claim 20 wherein said first database comprises a context file formed of a plurality of second records and further comprises, in said first one of the processors, the steps of:

storing a relative address to a fist one of the second records in the context file as an index value, said second records forming the context file within said first database; and incrementing the index value after each successive one of the second records has been established in the context file.

22. The method of claim 21 wherein said first message producing step comprises the step of forming said first transaction identifier to contain a plurality of separate fields wherein first, second and third ones of said separate fields contain corresponding numbers that respectively identify a specific one of the processors, a specific software process executing on the specific processor and a relative address pointing to a desired one of the plurality of second records residing within the context file situated in said first database.

* * * * *